United States Patent
Bang et al.

(10) Patent No.: US 10,674,555 B2
(45) Date of Patent: Jun. 2, 2020

(54) ELECTRONIC DEVICE AND METHOD FOR FORMING WI-FI DIRECT GROUP THEREOF

(71) Applicant: Samsung Electronics Co., Ltd., Suwon-si, Gyeonggi-do (KR)

(72) Inventors: Hyejung Bang, Seoul (KR); Bumjib Kim, Suwon-si (KR); Hyunah Oh, Yongin-si (KR); Dongjea Jung, Suwon-si (KR); Namju Cho, Yongin-si (KR); Buseop Jung, Suwon-si (KR); Bokun Choi, Seoul (KR); Doosuk Kang, Suwon-si (KR); Minjung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/976,228

(22) Filed: May 10, 2018

(65) Prior Publication Data
US 2019/0053302 A1 Feb. 14, 2019

(30) Foreign Application Priority Data

Aug. 8, 2017 (KR) .......................... 10-2017-0100284

(51) Int. Cl.
| | |
|---|---|
| *H04W 4/00* | (2018.01) |
| *H04W 76/14* | (2018.01) |
| *H04W 8/00* | (2009.01) |
| *H04W 4/08* | (2009.01) |
| *H04W 76/23* | (2018.01) |
| *H04W 84/12* | (2009.01) |
| *H04W 84/18* | (2009.01) |

(52) U.S. Cl.
CPC ............. *H04W 76/14* (2018.02); *H04W 4/08* (2013.01); *H04W 8/005* (2013.01); *H04W 76/23* (2018.02); *H04W 84/12* (2013.01); *H04W 84/18* (2013.01)

(58) Field of Classification Search
CPC ....... H04W 76/14; H04W 76/23; H04W 4/08; H04W 84/12; H04W 84/18
See application file for complete search history.

(56) References Cited

U.S. PATENT DOCUMENTS

| | | | |
|---|---|---|---|
| 9,392,630 B2 * | 7/2016 | Yi ........................ | H04W 74/04 |
| 2012/0290730 A1 * | 11/2012 | Desai ................... | H04L 67/104 |
| | | | 709/228 |
| 2014/0065962 A1 | 3/2014 | Le et al. | |

(Continued)

*Primary Examiner* — Abdelnabi O Musa
(74) *Attorney, Agent, or Firm* — Jefferson IP Law, LLP

(57) ABSTRACT

An electronic device and a method for forming a Wi-Fi direct group thereof are provided. The electronic device may include a housing, a wireless communication circuit, at least one processor, and a memory. The memory may cause the at least one processor to receive a first list of wireless channels for a direct connection from a first external device, establish, as a group owner, a first wireless connection with the first external device acting as a group client by using a first channel selected from the first list, listen for a probe request over a second channel every selected time period, receive the probe request from a second external device during the selected time period through the second channel, transmit a probe response to the second external device, receive a second list of wireless channels for a direct connection from the second external device, and select a third channel.

18 Claims, 16 Drawing Sheets

(56) References Cited

U.S. PATENT DOCUMENTS

2014/0306865 A1   10/2014  Pan et al.
2015/0245393 A1*  8/2015  Lee ....................... H04W 8/005
                                                                   370/338
2016/0048367 A1    2/2016  Chen
2016/0373914 A1* 12/2016  Lee ....................... H04W 8/005

* cited by examiner

ELECTRONIC DEVICE AND METHOD FOR FORMING WI-FI DIRECT GROUP THEREOF

CROSS-REFERENCE TO RELATED APPLICATION(S)

This application is based on and claims priority under 35 U.S.C. § 119(a) of a Korean Patent Application number 10-2017-0100284, filed on Aug. 8, 2017, in the Korean Intellectual Property Office, the disclosure of which is incorporated by reference herein in its entirety.

TECHNICAL FIELD

The disclosure relates to an electronic device. More particularly, the disclosure relates to an electronic device capable of forming a group for wireless communication with other devices via Wi-Fi direct (WFD) technology.

BACKGROUND

Wi-Fi Direct (WFD) uses an existing Wi-Fi interface to provide direct connectivity between multiple electronic devices, and it may provide direct connectivity between electronic devices without an access point (AP) acting as an intermediary of the infrastructure network. With WFD technology, various electronic devices can provide and discover services such as a data transmission service, playback service, printing service, display service, wireless docking service, and wireless serial bus (WSB) service. Thereby, one electronic device can wirelessly use the functions of another electronic device.

To utilize the WFD service, multiple electronic devices can form a group. One electronic device of the group operates as the group owner (GO), and the remaining electronic devices operate as a group client (GC). Here, the electronic device serving as the group owner performs a function corresponding to the access point of a wireless local area network (WLAN), and the electronic device acting as a group client performs a function corresponding to a station of the WLAN.

The group formed using the WFD technology can support not only 1:1 connections but also 1:N connections, and the number of admissible group clients can be determined based on the performance of the group owner.

The connections of a WFD group are centered around the group owner electronic device. An electronic device wishing to communicate can perform intra base station subsystem communication with a group client electronic device of the WFD group only when it is wirelessly connected to the group owner electronic device of the WFD group. For example, in order for a new electronic device to join the WFD group formed around the group owner, a wireless connection must be established between the new electronic device and the electronic device serving as the group owner.

To this end, the new electronic device must be able to discover the group owner operating on the operating channel of that group. However, if the new electronic device does not support the operating channel of the group or searches for a particular channel only, the new electronic device cannot participate in the group.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that enables a third electronic device wishing to join an existing Wi-Fi Direct (WFD) group to easily discover and join the existing WFD group, and a method of forming a WFD group for the electronic device.

In accordance with an aspect of the disclosure, an electronic device is provided. The electronic device includes a housing, a wireless communication circuit positioned inside the housing, at least one processor positioned inside the housing and electrically connected to the wireless communication circuit, and a memory positioned inside the housing and electrically connected to the at least one processor. The memory may store instructions that, when executed, cause the at least one processor and/or the wireless communication circuit to receive a first list of wireless channels for a WFD connection from a first external device, establish, as a group owner, a first wireless connection with the first external device acting as a group client by using a first channel of a first frequency band selected from the first list, while maintaining the first wireless connection, listen for a probe request over a second channel of a second frequency band different from the first frequency band every selected time period, receive the probe request from a second external device during the selected time period through the second channel, transmit a probe response to the second external device through the second channel, receive a second list of wireless channels for a direct connection from the second external device over the second channel, and select a third channel that allows simultaneous connectivity with the first external device and the second external device based on the first list and the second list.

In accordance with another aspect of the disclosure, a method of WFD group formation for an electronic device. The method includes receiving a first list of wireless channels for a direct connection from a first external device, establishing, as the group owner, a first wireless connection with the first external device acting as a first group client by using a first channel of a first frequency band selected from the first list, listening for a probe request over a second channel of a second frequency band different from the first frequency band every selected time period while maintaining the first wireless connection, receiving the probe request from a second external device during the selected time period through the second channel, transmitting a probe response to the second external device through the second channel, receiving a second list of wireless channels for a Wi-Fi direct connection from the second external device over the second channel, and selecting a third channel that allows simultaneous connectivity with the first external device and the second external device at least partially based on the first list and the second list.

In accordance with another aspect of the disclosure, the electronic device includes a wireless communication circuit, at least one processor electrically connected to the wireless communication circuit, and a memory electrically connected to the at least one processor. The memory may store instructions that, when executed, cause the at least one processor and/or the wireless communication circuit to form a direct group with a first external device through a first channel, receive a probe request for forming a direct group from a second external device through a second channel of a frequency band different from the first channel, identify, in reply to the probe request, a third channel that is simultaneously accessible from the first external device, the second external device, and the electronic device, and form a direct group with the first external device and the second external device through the third channel.

In a feature of the disclosure, it is possible to provide a method for forming a WFD group. When a third electronic device wishes to join an existing WFD group, the method enables the third electronic device to easily discover and join the existing WFD group. It is also possible to provide an electronic device supporting the WFD group formation method.

Other aspects, advantages, and salient features of the disclosure will become apparent to those skilled in the art from the following detailed description, which, taken in conjunction with the annexed drawings, discloses various embodiments of the disclosure.

DETAILED DESCRIPTION

Figure 1:
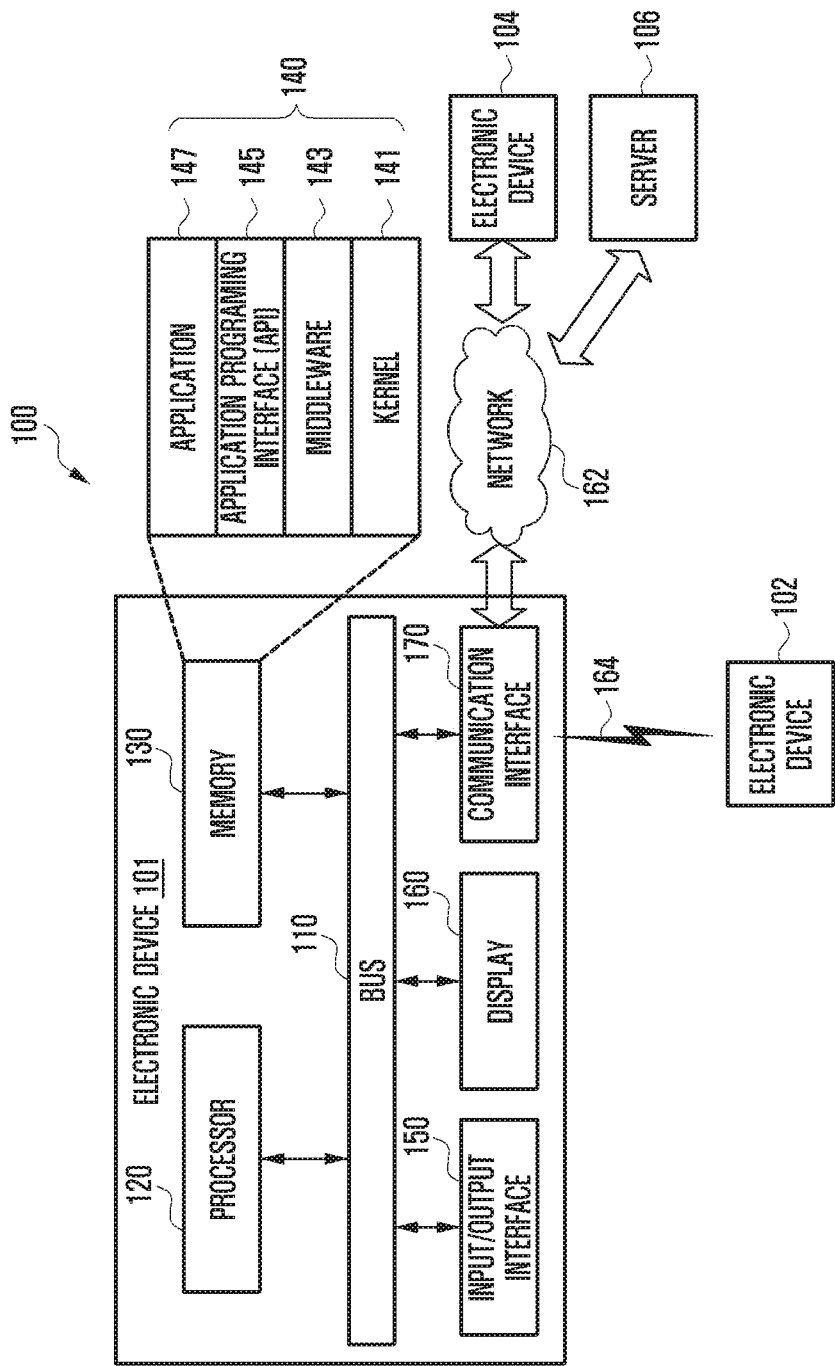
FIG. 1 illustrates a network environment including electronic devices according to various embodiments of the disclosure.

The following description reference to the accompanying drawings is provided to assist in a comprehensive understanding of various embodiments of the disclosure as defined by the claims and their equivalents. While the disclosure may be embodied in many different forms, specific embodiments of the disclosure are illustrated in drawings and are described herein in detail, with the understanding that the disclosure is to be considered as an example of the principles of the disclosure and is not intended to limit the disclosure to the specific embodiments illustrated. The same reference numbers are used throughout the drawings to refer to the same or like parts.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the disclosure indicates presence of a corresponding function, operation, or element and does not limit additional at least one function, operation, or element. Further, in the disclosure, a term "comprise" or "have" indicates presence of a characteristic, numeral, step, operation, element, component, or combination thereof described in the disclosure and does not exclude presence or addition of at least one other characteristic, numeral, step, operation, element, component, or combination thereof.

In the disclosure, an expression "or" includes any combination or the entire combination of together listed words. For example, "A or B" may include A, B, or A and B.

An expression of a first and a second in the disclosure may represent various elements of the disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the disclosure are not to limit the disclosure but to illustrate example embodiments. When using in a description of the disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable media player (PMP), an MP3 player, a portable medical device, a digital camera, or a wearable device (e.g., an head-mounted device (HMD) such as electronic glasses, electronic clothes, an electronic bracelet, an electronic necklace, an electronic accessory, or a smart watch), or the like, but is not limited thereto.

According to some embodiments, an electronic device may be a smart home appliance that involves a communication function. For example, an electronic device may be a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 illustrates a network environment including electronic devices according to an example embodiment of the disclosure.

Referring to FIG. 1, a network environment 100 may include an electronic device 101 having a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic device 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic device 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic device 101 and other electronic devices 102 and 104 and/or a server 106. The communication interface 170 can support a direct connection using various short range communication protocols, e.g. a Wi-Fi protocol, a Bluetooth (BT) protocol, and a Near Field Communication (NFC) protocol, or a connecting using communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
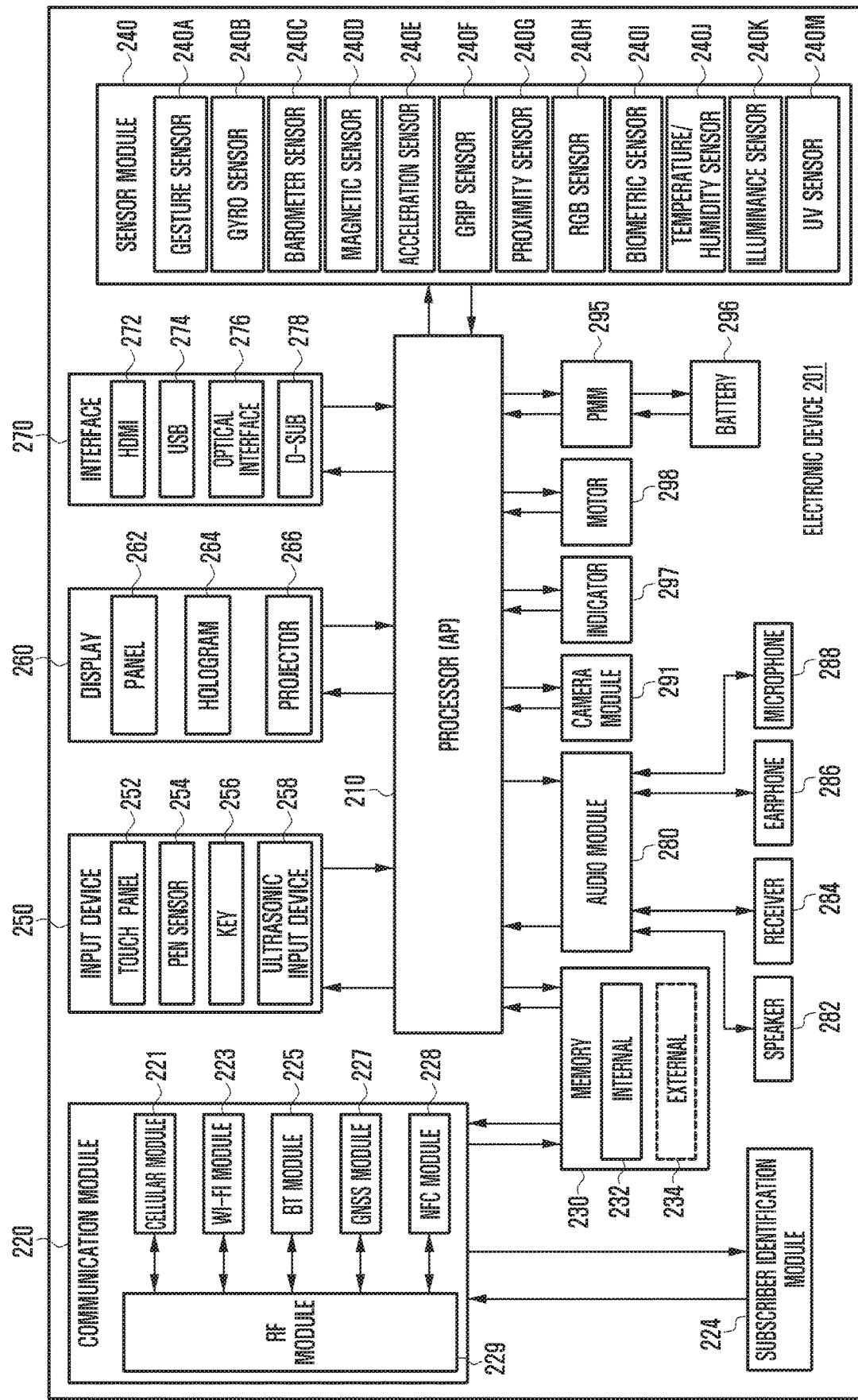
FIG. 2 is a block diagram of an electronic device according to various embodiments of the disclosure.

FIG. 2 is a block diagram of an electronic device according to various embodiments of the disclosure.

Referring to FIG. 2, the electronic device 201 may form, for example, the whole or part of the electronic device 101 shown in FIG. 1. The electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry, and drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 101 (e.g., the electronic device 201) through the network. According to an embodiment, the communication module 220 may include various communication circuitry, such as, for example, and without limitation, a cellular module 221, a Wi-Fi module 223, a BT module 225, a global navigation satellite system (GNSS) module 227, an NFC module 228, and a radio frequency (RF) module 229.

The cellular module 221 may offer a voice call, a video call, a message service, an internet service, or the like through a communication network (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the Wi-Fi module 223, the BT module 225, the GNSS module 227 and the NFC module 228 may include a processor for processing data transmitted or received therethrough. Although FIG. 2 shows the cellular module 221, the Wi-Fi module 223, the BT module 225, the GNSS module 227 and the NFC module 228 as different blocks, at least part of them may be contained in a single integrated circuit (IC) chip or a single IC package in an embodiment. For example, at least part (e.g., the CP corresponding to the cellular module 221 and a Wi-Fi processor corresponding to the Wi-Fi module 223) of respective processors corresponding to the cellular module 221, the Wi-Fi module 223, the BT module 225, the GNSS module 227 and the NFC module 228 may be formed as a single SoC.

The RF module 229 may transmit and receive data, e.g., RF signals or any other electric signals. Although not shown, the RF module 229 may include a transceiver, a power amplifier module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the Wi-Fi module 223, the BT module 225, the GNSS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an integrated circuit card identifier (ICCID) or an international mobile subscriber identity (IMSI).

The memory 230 may include an internal memory 232 and/or an external memory 234. The internal memory 232 may include, for example, at least one of a volatile memory (e.g., random access memory (RAM), dynamic RAM (DRAM), static RAM (SRAM), synchronous DRAM (SDRAM), etc.) or a nonvolatile memory (e.g., a read only memory (ROM), one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the internal memory 232 may have the form of a solid state drive (SSD). The external memory 234 may include a flash drive, e.g., compact flash (CF), secure digital (SD), micro-SD, mini-SD, extreme digital (xD), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric (e.g., barometer) sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination (e.g., illuminance/light) sensor 240K, and an ultraviolet (UV) sensor 240M. Additionally or alternatively, the sensor module 240 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 may include a panel 262, a hologram 264, or a projector 266. The panel 262 may be, for example, liquid crystal display (LCD), active matrix organic light emitting diode (AM-OLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be contained, for example, in the communication module 220 shown in FIG. 2. Additionally or alternatively, the interface 270 may include, for example, a mobile high-definition link (MHL) interface, an SD) card/multimedia cart (MMC) interface, or an infrared data association (IrDA) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an image signal processor (ISP) (not shown), or a flash (e.g., a light emitting diode (LED) or xenon lamp, not shown).

The power management module 295 may manage electric power of the electronic device 201. Although not shown, the power management module 295 may include, for example, a power management integrated circuit (PMIC), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of digital multimedia broadcasting (DMB), digital video broadcasting DVB, or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a central processing unit (CPU), an application specific IC (ASIC), a field-programmable gate array (FPGA), and programmable-logic device, which have been known or are to be developed.

Figure 3A:
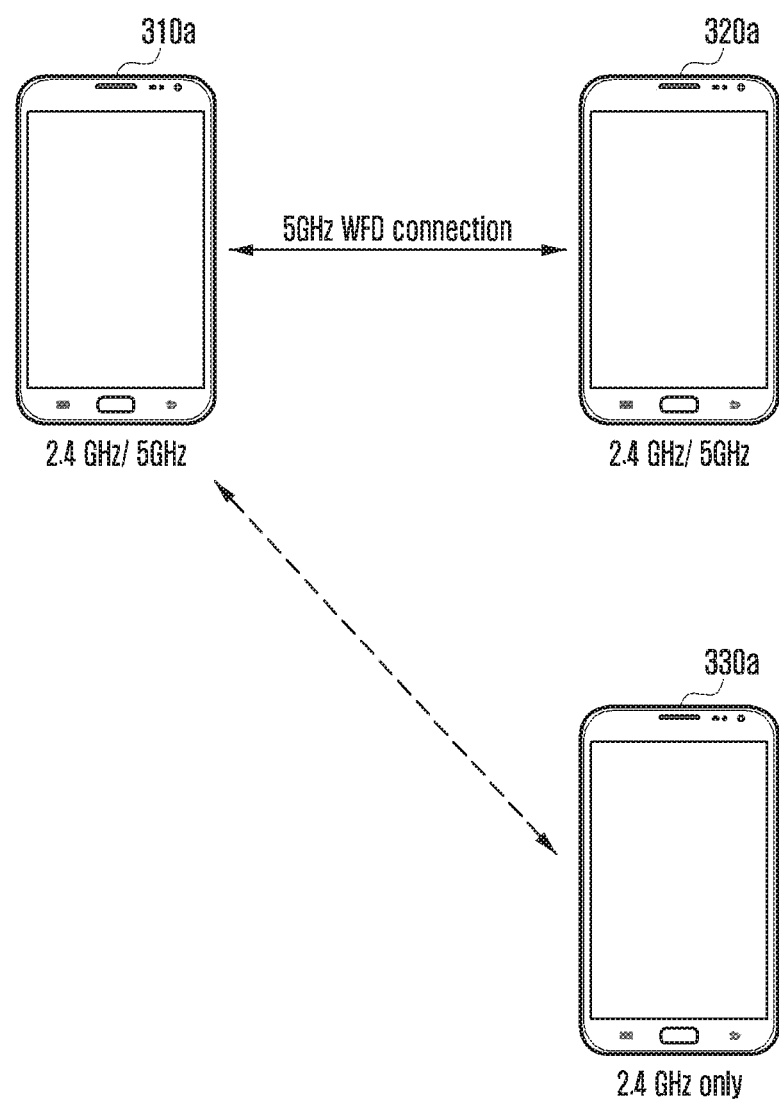
FIGS. 3A, 3B, and 3C depict an electronic device, a first external device, and a second external device according to various embodiments of the disclosure.
Figure 3B:
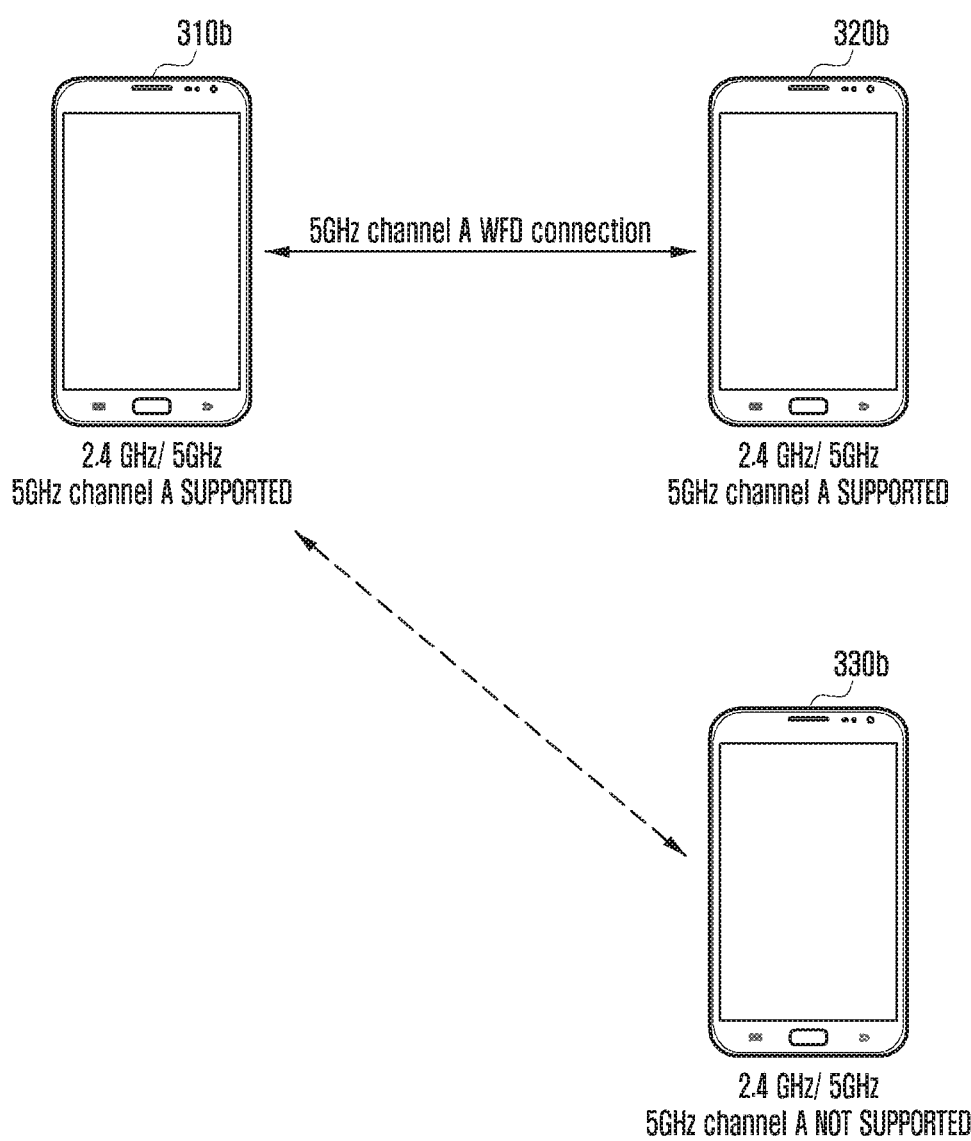
Figure 3C:
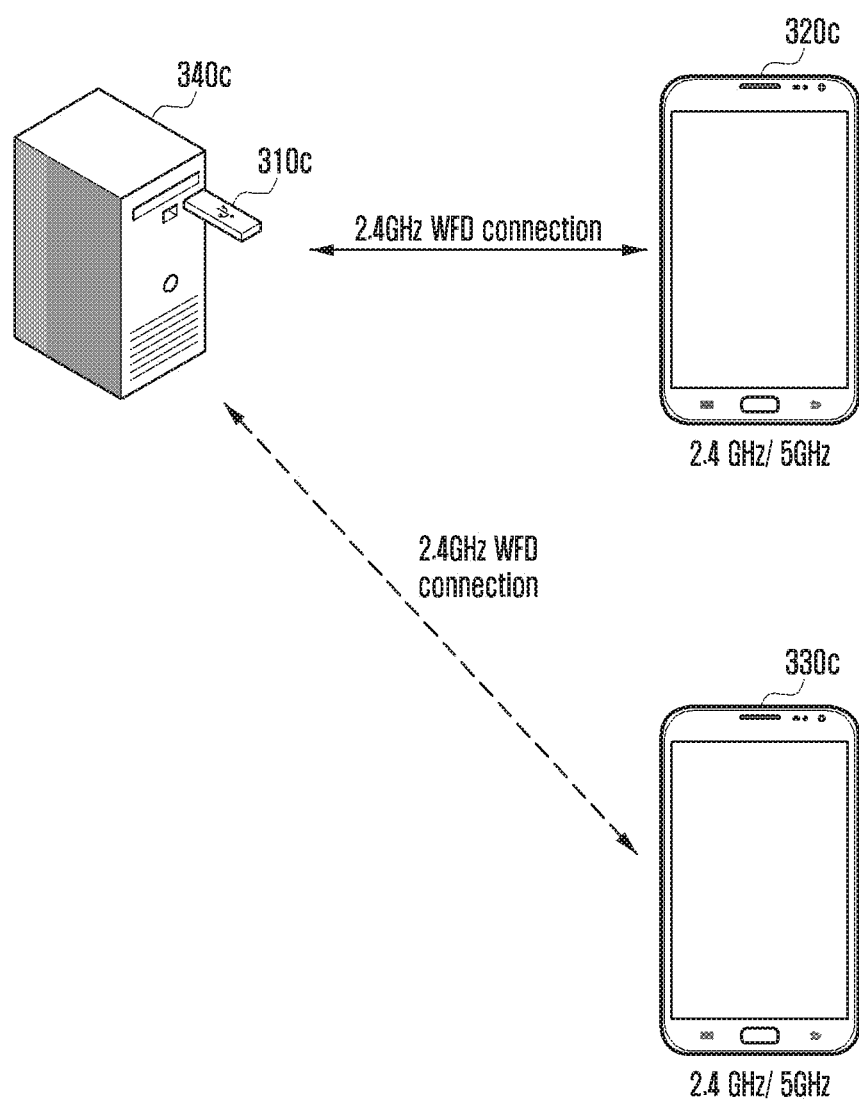

FIGS. 3A, 3B, and 3C depict an electronic device, a first external device, and a second external device according to various embodiments of the disclosure.

Referring to FIGS. 3A, 3B, and 3C, the electronic device 310a, 310b or 310c, the first external device 320a, 320b or 320c, and/or the second external device 330a, 330b or 330c may be connected (or may form a group) via Wi-Fi direct (WFD), which is also referred to as Wi-Fi peer-to-peer (P2P). The electronic device, the first external device, and the second external device may comply with WFD related protocols defined in the IEEE 802.11 alliance technical standards (e.g., IEEE 802.11g and IEEE 802.11n) and may use the 5 GHz frequency band and the 2.4 GHz frequency band.

In the disclosure, a description is given of a technique whereby the electronic device 310a, 310b or 310c, the first external device 320a, 320b or 320c, and/or the second external device 330a, 330b or 330c form a group according to the WFD related protocol defined in the IEEE 802.11 technical standards. However, the disclosure is not limited to the IEEE 802.11 technical standards, and various embodiments of the disclosure may be applied to various standard or non-standard technologies related to the wireless local area network (WLAN) connection. A detailed description on the IEEE 802.11 technical standards is omitted herein.

In one embodiment, the electronic device may be a portable electronic device such as a smartphone or a tablet personal computer (as indicated by indicia 310a or 310b). In another embodiment, the electronic device may be a wireless serial bus (WSB) dongle (as indicated by indicia 310c) that is connected to a universal serial bus (USB) socket of another device (e.g., personal computer) and provides wireless USB functionality via WFD. In various embodiments, the first external device 320a, 320b or 320c and the second external device 330a, 330b or 330c may be of the same type as the electronic device or may be of a different type from the electronic device. For example, the first external device and the second external device may be various types of electronic devices supporting WFD such as a TV, a printer, and a camera.

FIGS. 3A, 3B, and 3C illustrate various scenarios where the electronic device 310a, 310b or 310c and the first external device 320a, 320b or 320c are already connected (or forms a group) via WFD and the second external device 330a, 330b or 330c tries to join the group. In the following description, the wireless connection between the electronic device 310a, 310b or 310c and the first external device 320a, 320b or 320c may be referred to as a first wireless connection.

Referring to FIG. 3A, the electronic device 310a and the first external device 320a may each support the 2.4 GHz frequency band and the 5 GHz frequency band, and may form a WFD group using one channel in the 5 GHz frequency band. Here, the electronic device 310a may act as the group owner (GO), and the first external device 320a may act as a group client (GC).

In FIG. 3A, the second external device 330a is assumed to support only the 2.4 GHz band. In the following description, the 5 GHz band may be referred to as a first frequency band and the 2.4 GHz band may be referred to as a second frequency band. However, the first frequency band and the second frequency band are not necessarily limited thereto. For example, the electronic device 310a may support the 60 GHz band.

As the second external device 330a supports only the 2.4 GHz band, it may be unable to discover the WFD group of the electronic device 310a and the first external device 320a already formed in the 5 GHz band. In various embodiments, while providing a WFD service on one channel of the 5 GHz band, the electronic device 310a may discover, at regular intervals, a different external device wishing to join the group (e.g., second external device 330a) on a specific channel (e.g., social channel) of the 2.4 GHz band. Thereby, the second external device 330a may join the existing group including the electronic device 310a and the first external device 320a, or may become a member of a new group including the electronic device 310a, the first external device 320a, and the second external device 330a. In the following description, the wireless connection between the electronic device 310a and the second external device 330a may be referred to as a second wireless connection.

Referring to FIG. 3B, the electronic device 310b and the first external device 320b may form a WFD group through channel A in the 5 GHz frequency band. In FIG. 3B, the second external device 330b may support both the 2.4 GHz frequency band and the 5 GHz frequency band, but may not support channel A in the 5 GHz frequency band. For example, in the case of the 5 GHz frequency band, as frequency assignments may vary from country to country, electronic devices released in different countries may support different channels in the 5 GHz frequency band.

In this case, the electronic device 310b may discover the second external device 330b on a specific channel in the 2.4 GHz band. Thereby, the second external device 330b may join the existing group including the electronic device 310b and the first external device 320b, or may become a member of a new group including the electronic device 310b, the first external device 320b, and the second external device 330b.

Referring to FIG. 3C, the electronic device 310c is a wireless serial bus (WSB) dongle and may be connected to a USB socket of the PC 340c, which is another device. When the electronic device 310c is a WSB dongle, as the WSB provides the same service as the USB, the electronic device 310c always operates as the group owner without group owner negotiation (GO negotiation) with an external device to be connected through WFD, and waits for the external device 320c or 330c to be connected. In one embodiment, the electronic device 310c may operate only on a base channel in the 2.4 GHz frequency band so that it can be connected to various external devices in the vicinity. This is because most commercial devices support the base channels in the 2.4 GHz frequency band.

In this case, the external device 320c or 330c wishing to join the group formed by the electronic device 310c may have to receive the USB service using WFD (i.e., the WSB service) only through the base channel regardless of the WFD channel supported by it. For example, the first external device 320c may be connected to the electronic device 310c via the base channel of the 2.4 GHz frequency band. When the second external device 330c wishes to join the group formed between the electronic device 310c and the first external device 320c, although the second external device 330c may support the 5 GHz frequency band in addition to the 2.4 GHz frequency band, it can join the group only through the 2.4 GHz frequency band.

In various embodiments of the disclosure, when there is an external device 320c or 330c wishing to connect, a list of channels supported by the external device 320c or 330c is received, the received channel list is compared with a list of channels supported by the electronic device 310c, and a new operating channel is configured and the WSB service is provided on the new operating channel.

Next, a description is given of various embodiments of the disclosure where the electronic device 310a, 310b or 310c establishes a WFD connection with an external device wishing to join the group (e.g., second external device 320a, 320b or 20c) in a situation as shown in FIG. 3A, 3B or 3C. However, embodiments of the disclosure are not limited to the scenarios of FIGS. 3A to 3C.

Figure 4:
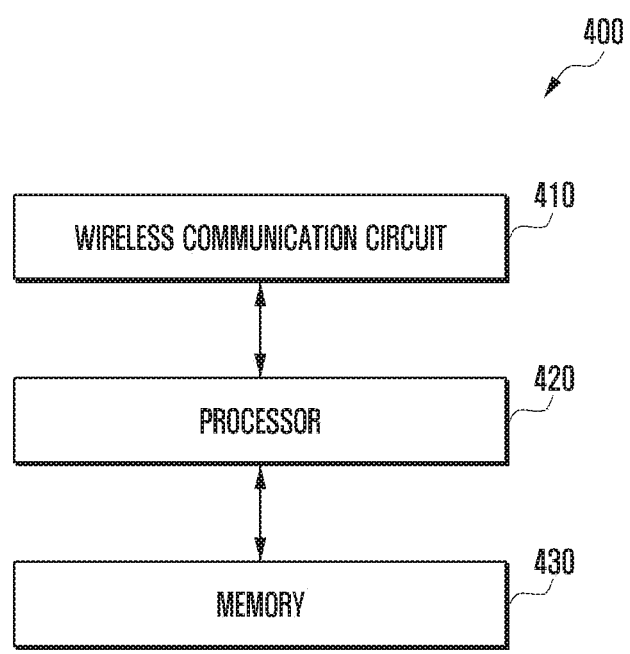
FIG. 4 is a block diagram of an electronic device according to various embodiments of the disclosure.

FIG. 4 is a block diagram of an electronic device according to various embodiments of the disclosure.

Referring to FIG. 4, the electronic device 400 may include a wireless communication circuit 410, a processor 420, and a memory 430. Although some of the listed components are omitted or substituted, it will not hinder the implementation of various embodiments of the disclosure. The electronic device 400 may include at least some of the components and/or functions of the electronic device 101 of FIG. 1 and/or the electronic device 201 of FIG. 2.

The wireless communication circuit 410 is configured to wirelessly communicate with an external device (e.g., first external device 320a, 320b or 320c and second external device 330a, 330b or 330c in FIGS. 3A to 3C), and may include software and/or hardware modules for Wi-Fi communication. The wireless communication circuit 410 may perform wireless communication with an external device through at least one channel in a first frequency band (e.g., 5 GHz frequency band) and/or a second frequency band (e.g., 2.4 GHz frequency band), and it may include antennas (e.g., first and second antennas (not shown)) and a communication processor for transmitting and receiving radio waves of the frequency bands. In one embodiment, the wireless communication circuit 410 may include separate Wi-Fi chipsets (not shown) corresponding respectively to the frequency bands. In another embodiment, one of the plural Wi-Fi chipsets included in the wireless communication circuit 410 may support multiple frequency bands (e.g., first frequency band (5 GHz frequency band) and second frequency band (2.4 GHz frequency band)), and the other may support another different frequency band (e.g., third frequency band (60 GHz frequency band)).

The wireless communication circuit 410 may include at least some of the components and/or functions of the communication interface 170 in FIG. 1 and/or the communication module 220 in FIG. 2.

The memory 430 may include a volatile memory and a non-volatile memory, and is not limited to a specific implementation. The memory 430 may include at least some of the components and/or functions of the memory 130 in FIG. 1 and/or the memory 230 in FIG. 2.

The memory 430 is electrically connected to the processor 420 and may store various instructions that can be executed by the processor 420. Such instructions may correspond to arithmetic and logic operations or control operations for data movement and input/output, which may be recognized by the processor 420. The operation of the processor 420 (described later) may be performed by loading the instructions stored in the memory 430.

In various embodiments, the processor 420 is configured to perform control, communication and data processing operations for the individual components of the electronic device 400, and may include at least some of the components of the processor 120 in FIG. 1 and/or the AP 210 in FIG. 2. The processor 420 may be electrically connected to the internal components of the electronic device 400 such as the wireless communication circuit 410 and the memory 430.

In various embodiments, the electronic device 400 may include a plurality of processors 420, and the operation of the processor 420 described herein may be performed by at least some of the plurality of processors 420. The plurality of processors 420 may be arranged on separate pieces of hardware (e.g., SoC), which are physically and electrically separated. Hence, the operations of the processor 420 described below may be performed partly through different hardware configurations.

The operation of the processor 420 is not particularly limited, but various control operations of the processor 420 for forming a WFD group will be described in detail below.

Although not shown in FIG. 4, the electronic device 400 may further include various components such as a display (e.g., display 160 in FIG. 1 and/or display 260 in FIG. 2), an input unit (e.g., input device 250 in FIG. 2), and a sensor module (e.g., sensor module 240 in FIG. 2). There is no particular limitation on the hardware and software configuration that the electronic device 400 can take. The above various components of the electronic device 400 may be arranged inside a housing (not shown), and at least some of which may be electrically connected to each other.

In various embodiments, the processor 420 and/or the wireless communication circuit 410 may form a WFD group (or WFD P2P group) with a first external device and/or a second external device. This is described in more detail later with reference to FIG. 5.

According to various embodiments of the disclosure, the electronic device 400 may include a housing, a wireless communication circuit 410 positioned inside the housing, at least one processor 420 positioned inside the housing and electrically connected to the wireless communication circuit 410, and a memory 430 positioned inside the housing and electrically connected to the processor 420, wherein the memory 430 may store instructions that, when executed, cause the processor 420 and/or the wireless communication circuit 410 to receive a first list of wireless channels for a WFD connection from a first external device 320, establish, as a GO, a first wireless connection with the first external device 320 acting as a GC by using a first channel of a first frequency band selected from the first list, listen to a probe request over a second channel of a second frequency band different from the first frequency band every selected time period while maintaining the first wireless connection, receive a probe request from a second external device 330 during the selected time period through the second channel, transmit a probe response to the second external device 330 through the second channel, receive a second list of wireless channels for a WFD connection from the second external device 330 over the second channel, and select a third channel that allows simultaneous connectivity with the first and second external devices 320 and 330 at least partially based on the first list and the second list.

In one embodiment, the instructions may further cause the processor 420 and/or the wireless communication circuit 410 to select the third channel further based on a list of channels available to the electronic device 400.

In one embodiment, the first frequency band includes a 5 GHz band, and the second frequency band includes a 2.4 GHz band.

In one embodiment, the wireless communication circuit 410 may be configured to support the Wi-Fi alliance technical specification.

In one embodiment, the instructions may further include instructions that, if at least one external device including the first external device 320 connected to the electronic device 400 via the first channel allows channel switching to a different channel while maintaining the connection via the first channel, cause the processor 420 and/or the wireless communication circuit 410 to perform channel switching so that the connectivity to the at least one external device is changed from the first channel to the selected third channel.

In one embodiment, the instructions may further include instructions that, if at least one external device including the first external device 320 connected to the electronic device 400 via the first channel does not allow channel switching to a different channel while maintaining the connection via the first channel, cause the processor 420 and/or the wireless communication circuit 410 to form a new group based on the third channel and send a connection request to the at least one external device including the first external device 320 and the second external device 330 to connect via the third channel.

In one embodiment, the instructions may further include instructions that cause the processor 420 and/or the wireless communication circuit 410 to alternately perform wireless communication with the first external device 320 on the first channel and listening operation on the second channel in such a manner that the operation cycle of the wireless communication circuit 410 is time-divided.

In one embodiment, the electronic device may further include a first antenna operating in the first frequency band and a second antenna operating in the second frequency band, and the instructions may further include instructions that cause the processor 420 and/or the wireless communication circuit 410 to perform listening operation on the second channel via the second antenna at least partially simultaneously with wireless communication with the first external device 320 on the first channel via the first antenna.

In one embodiment, the instructions may include instructions that, upon transmitting a probe response to the second external device 330 through the second channel, cause the processor 420 and/or the wireless communication circuit 410 to transmit a probe response not containing group information at the first channel.

According to various embodiments of the disclosure, the electronic device 400 may include a wireless communication circuit 410, at least one processor 420 electrically connected to the wireless communication circuit 410, and a memory 430 electrically connected to the processor 420, wherein the memory 430 may store instructions that, when executed, cause the processor 420 and/or the wireless communication circuit 410 to form a WFD group with a first external device 320 through a first channel, receive a probe request for forming a WFD group from a second external device 330 through a second channel of a frequency band different from the first channel, identify, in response to the probe request, a third channel that is simultaneously accessible from the first external device 320, the second external device 330, and the electronic device 400, and form a WFD group with the first external device 320 and the second external device 330 through the third channel.

Figure 5:
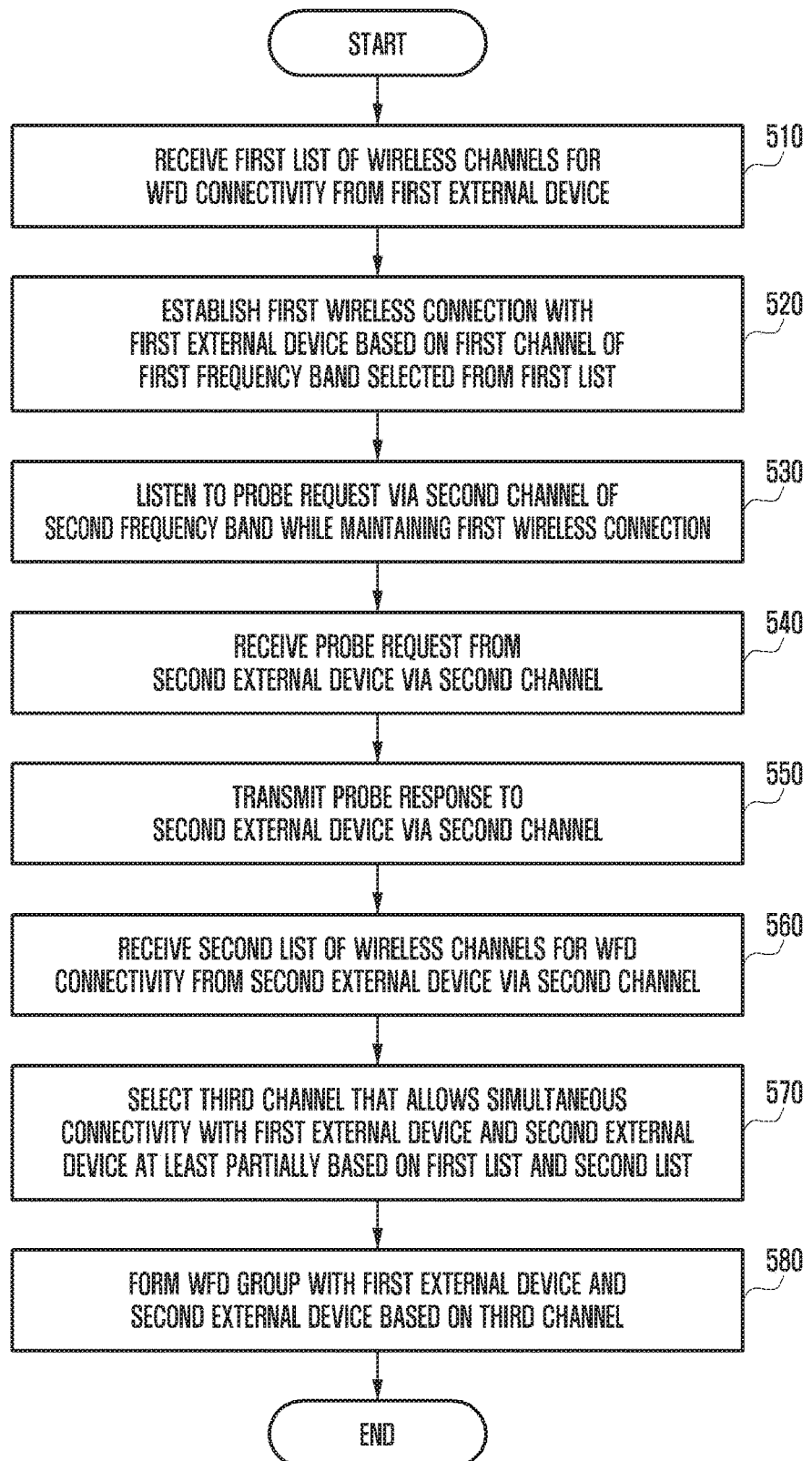
FIG. 5 is a flowchart of a method for an electronic device to form a Wi-Fi direct (WFD) group according to various embodiments of the disclosure.

FIG. 5 is a flowchart of a method for an electronic device to form a WFD direct group according to various embodiments of the disclosure.

Referring to FIG. 5, the method depicted in FIG. 5 may be represented as instructions and stored in the memory 430 of FIG. 4, and the processor 420 and/or the wireless communication circuit 410 may execute the stored instructions to thereby execute the method.

At operation 510, the processor (e.g., processor 420 in FIG. 4) may receive a first list of wireless channels for a WFD connection (or Wi-Fi P2P connection) from a first external device (e.g., first external device 320a, 320b or 320c). In one embodiment, the first external device may transmit the electronic device the first list of wireless channels that it can support by including the first list in a GO negotiation request and/or GO negotiation response transmitted and received during group owner negotiation for a WFD connection.

At operation 520, the processor may establish a first wireless connection with the first external device based on a first channel of the first frequency band (e.g., 5 GHz frequency band) selected from the first list. Here, during group owner negotiation, the electronic device may be determined as the group owner, and the first external device may be determined as a group client. After the first wireless connection is established, the processor may perform data communication for the WFD service with the first external device. This data communication may be performed at least partially simultaneously with at least some of operations 530 to 580 described below.

At operation 530, the processor may listen to a probe request from an external device (e.g., second external device 330a, 330b or 330c in FIGS. 3A to 3C) over a second channel of the second frequency band every selected time period while maintaining the first wireless connection. The second frequency band is different from the first frequency band, and may be, for example, the 2.4 GHz band. The second external device can support the second frequency band only without supporting the first frequency band, and the electronic device can exchange messages for WFD group formation with the second external device through the second channel.

In one embodiment, the processor may alternately perform wireless communication with the first external device on the first channel and listening operation on the second channel in such a manner that the operation cycle of the wireless communication circuit is time-divided. This embodiment is described in more detail with reference to FIG. 11. In another embodiment, the processor may simultaneously perform wireless communication with the first external device on the first channel via a first antenna of the wireless communication circuit and listening operation on the second channel via a second antenna. This embodiment is described in more detail with reference to FIG. 12.

At operation 540, the processor may receive a probe request from a second external device during the selected time period through the second channel. Here, the probe request may include various information necessary for WFD connectivity, such as a user-defined device name, a device type (e.g., smartphone, TV or printer), a P2P information element (IE), a Wi-Fi simple configuration WSC IE, and a support regulation IE.

At operation 550, in response to reception of the probe request, the processor may transmit a probe response to the second external device.

At operation 560, the processor may receive a second list of wireless channels for WFD connectivity from the second external device via the second channel. Here, the second list may be included in a group owner negotiation frame (e.g., GO negotiation request and/or GO negotiation response).

At operation 570, the processor may select a third channel that allows simultaneous connectivity with the first external device and the second external device at least partially based on the first list and the second list. In one embodiment, the third channel may be a channel in the second frequency band, and may be the same as the second channel used for listening. In another embodiment, the processor may select the third channel further based on a list of channels available to the electronic device. That is, the processor may identify channels that are simultaneously accessible from the electronic device, the first external device, and the second external device to select the third channel.

At operation 580, the processor may form a WFD group with the first external device and the second external device based on the third channel. In one embodiment, if the first external device allows channel switching to a different channel while maintaining the connection via the first channel (e.g., the first external device supports extended channel switching (ECS)), the processor may perform channel switching so that the connectivity to the first external device is changed from the first channel to the third channel. In another embodiment, if the first external device does not allow channel switching to a different channel while maintaining the connection via the first channel (e.g., the first external device does not support ECS), the processor may form a new group based on the third channel and send a connection request to the first external device and the second external device to connect via the third channel.

Figure 6:
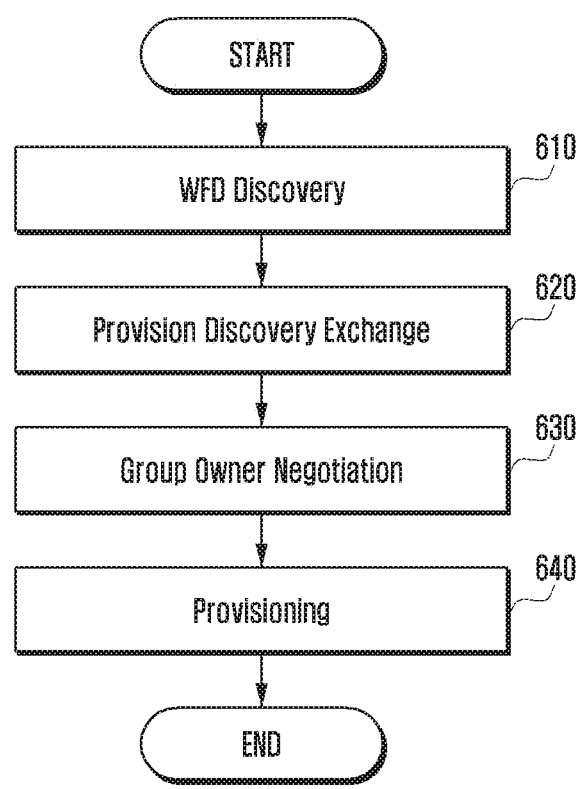
FIG. 6 is a flowchart of a group formation process for an electronic device and a first external device according to various embodiments of the disclosure.

FIG. 6 is a flowchart of a group formation process for an electronic device and a first external device according to various embodiments of the disclosure.

Figure 7:
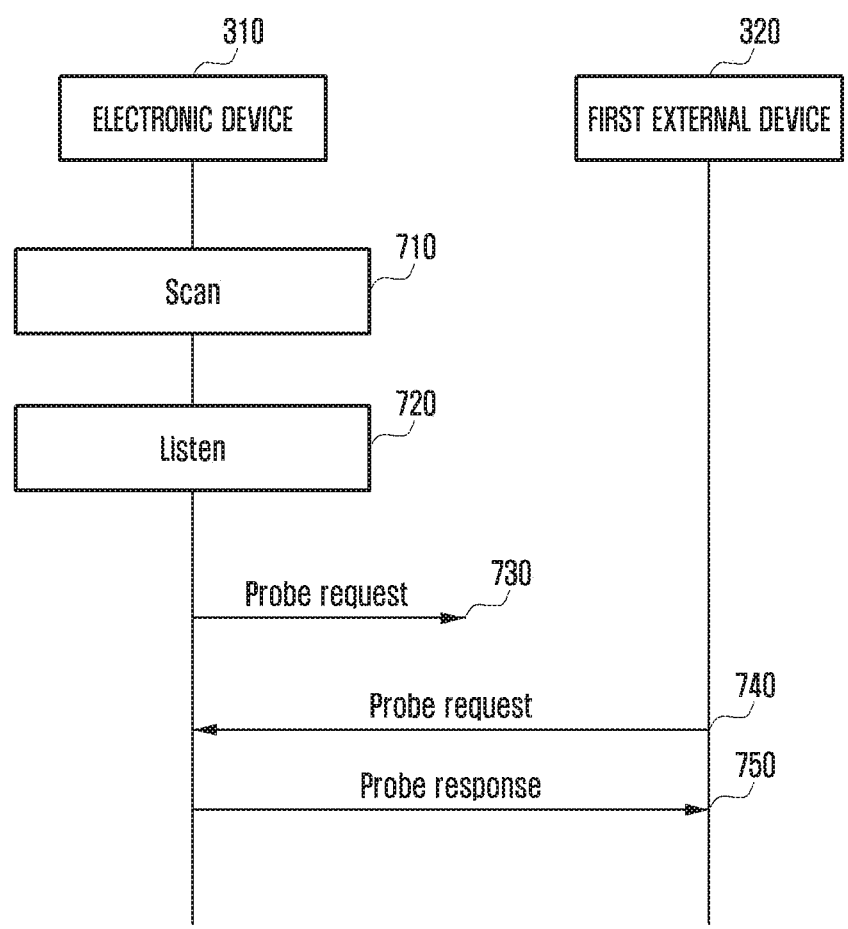
FIG. 7 is a sequence diagram illustrating a process for an electronic device to discover a first external device according to various embodiments of the disclosure.
Figure 8:
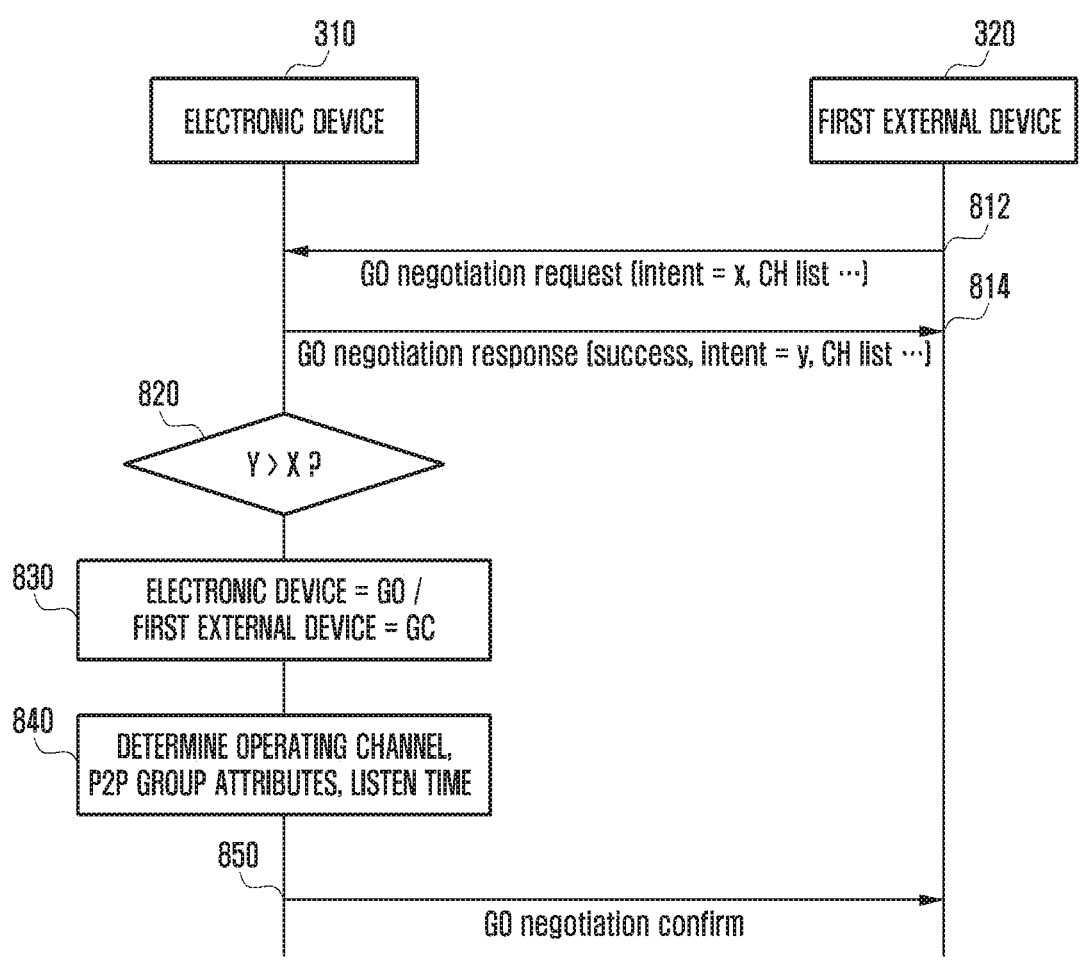
FIG. 8 is a sequence diagram illustrating group owner (GO) negotiation between an electronic device and a first external device according to various embodiments of the disclosure.
Figure 9:
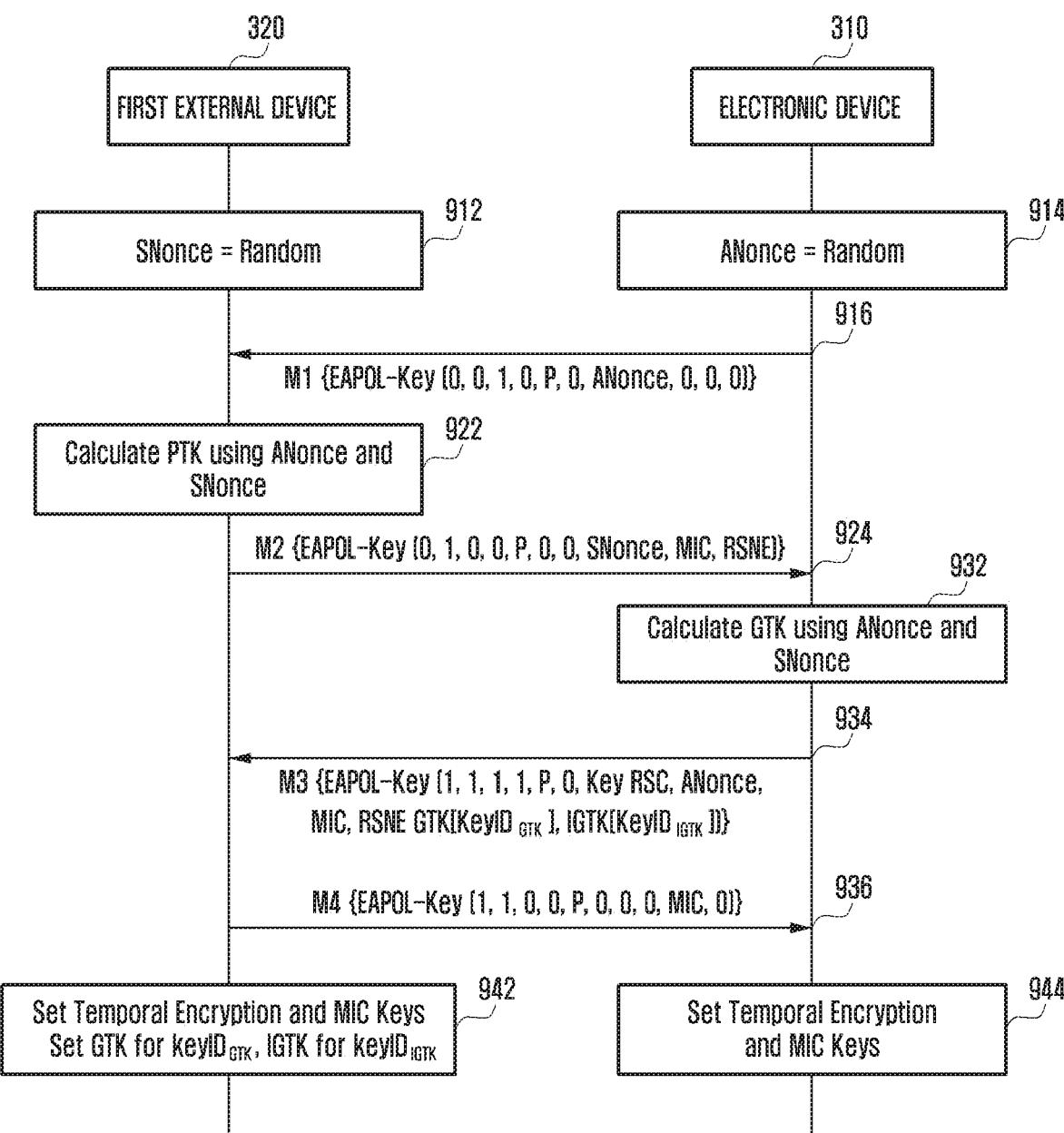
FIG. 9 is a sequence diagram illustrating a process for an electronic device to discover a first external device according to various embodiments of the disclosure.

Referring to FIG. 6, a description is given of a group formation process (e.g., operations 510 to 520 in FIG. 5) for the electronic device 310 (e.g. electronic device 310a, 310b or 310c in FIGS. 3A to 3C, or electronic device 400 in FIG. 4) and the first external device (e.g. first electronic device 320a, 320b or 320c in FIGS. 3A to 3C). FIGS. 7 to 9 will be further referred to when necessary.

FIG. 7 is a sequence diagram illustrating a process for an electronic device to discover a first external device according to various embodiments of the disclosure.

FIG. 8 is a sequence diagram illustrating GO negotiation between an electronic device and a first external device according to various embodiments of the disclosure.

FIG. 9 is a sequence diagram illustrating a process for an electronic device to discover a first external device according to various embodiments of the disclosure.

Referring to FIGS. 6, 7, 8, and 9, the operations listed may be performed by the processor (e.g., processor 420 in FIG. 4) and/or the wireless communication circuit (e.g., wireless communication circuit 410 in FIG. 4).

Referring to FIG. 6, WFD discovery at operation 610 is a process for the electronic device 310 to search for a nearby external device that can be connected through WFD. In order for the electronic device 310 to access an access point (AP) as a Wi-Fi station, the electronic device 310 may identify the presence of the AP through scanning (e.g., exchanging a probe request and a probe response). Similarly, for WFD connectivity, the electronic device 310 may first perform the WFD discovery process, which is a process of recognizing the presence of another device (or peer device).

Referring to FIG. 7, the electronic device 310 (e.g., processor or wireless communication circuit) may perform scanning for all channels at operation 710, and may perform listening to receive a probe request from an external device via at least one channel at operation 720. For example, the wireless communication circuit may perform scanning and listening via common channels (e.g., channels 1, 6 and 11) of a first frequency band (e.g., 5 GHz frequency band) or a second frequency band (2.4 GHz frequency band).

At operation 730, the electronic device (e.g., processor) may transmit a probe request to an unspecified external device via at least one of the common channels. At operation 740, the electronic device (e.g., processor) may receive a probe request from a first external device 320 via one of the common channels. Upon receiving a probe request, at operation 750, the electronic device (e.g., processor) may transmit a probe response to the first external device 320.

In various embodiments, the probe request may include a P2P information element (IE), a Wi-Fi simple configuration (WSC) IE, and a support regulation IE, and the probe response may include a P2P IE, a WSC IE, a support regulation IE, and a robust security network (RSN) IE. The electronic device 310 may identify the presence of at least one external device at operation 610, and may exchange provision discovery with the first external device 320 wishing to connect at operation 620.

The electronic device 310 may transmit a desired WSC scheme to the first external device 320, and the first external device 320 may provide information to the user thereof using a pop-up window or the like. Here, the pop-up window may display information that can identify the electronic device 310 having made a connection request, such as the device name and device type (e.g., smartphone, TV, or printer). The first external device 320 may perform a connection admission control process by requesting the user to decide whether to accept the connection request, displaying a personal identification number (PIN) required for the WSC, or activating an input window.

In various embodiments, the WSC scheme used for provision discovery may include at least one of push button configuration (PBC), PIN from display, and PIN from keypad. For example, when the electronic device 310 transmits "PIN from display" as a WSC scheme, the first external device 320 may notify the user of the connection request from the electronic device 310 by displaying the WSC PIN. When the electronic device 310 transmits "PIN from key-pad" as a WSC scheme, the first external device 320 may display a window through which the user can enter the PIN.

It has been described above at operation 620 that the electronic device 310 transmits the WSC scheme to the first external device 320 to initiate provision discovery. Conversely, the first external device 320 may transmit the WSC scheme to the electronic device 310 to initiate the same process.

The electronic device 310 may perform group owner negotiation at operation 630. In WFD connectivity, an AP is not required, but a process is required to determine which device should act as an AP between the connected devices. The device that acts like an AP is called the group owner, and the device that is connected to the group owner is called a group client.

GO negotiation may include exchanging a GO negotiation request frame, a GO negotiation response frame, and a GO negotiation confirm frame. The GO negotiation request and the GO negotiation response may include a GO intent value of each device, and the device with a larger GO intent value can serve as the group owner. The attribute of the WFD group to be formed after the connection, the operating channel, and the listening timing can also be determined during group owner negotiation.

Referring to FIG. 8, at operation 812, the first external device 320 may send a GO negotiation request to the electronic device 310. The GO negotiation request (and/or the GO negotiation response) may include a GO intent value set by the first external device 320 and a list (e.g., first list) of channels available to the first external device 320. In various embodiments, the GO negotiation request (and/or the GO negotiation response) may further include a user-defined device name and device type (e.g., smartphone, TV or printer).

At operation 814, the electronic device 310 may send a GO negotiation response to the first external device 320 in response to the GO negotiation request. The GO negotiation response may include the result of group owner negotiation (e.g., success or failure), a GO intent value of the electronic device 310, and a list of channels available to the electronic device 310. In one embodiment, the electronic device 310 may identify channels commonly included in the channel list of the GO negotiation request and in the list of channels available to the electronic device 310, and designate one of the identified channels as an operating channel. This operating channel can be specified in the GO negotiation response for transmission.

Table 1 below illustrates the P2P attributes specifiable in the GO negotiation request frame.

TABLE 1

P2P attributes in the GO negotiation Request frame

| Attributes | Attribute ID | Note |
| --- | --- | --- |
| P2P Capability | 2 | The P2P Capability attribute shall be present in the P2P IE. |
| Group Owner Intent | 4 | The Group Owner Intent attribute shall be present in the P2P IE. |
| Configuration Timeout | 5 | The Configuration Timeout attribute shall be present in the P2P IE. |
| Listen Channel | 6 | The Listen Channel attribute shall be present in the P2P IE. |
| Extended Listen Timing | 8 | The Extended Listen Timing attribute may be present in the P2P IE to advertise Listen State availability of the P2P Device sending the GO Negotiation Request. |

TABLE 1-continued

P2P attributes in the GO negotiation Request frame

| Attributes | Attribute ID | Note |
| --- | --- | --- |
| Intended P2P Interface Address | 9 | The Intended P2P Interface Address attribute shall be present in the P2P IE. |
| Channel List | 11 | The Channel List attribute shall be present in the P2P IE. |
| P2P Device Info | 13 | The P2P Device Information attribute shall be present in the P2P IE. |
| Operating Channel | 17 | The Operating Channel attribute shall be present in the P2P IE. |

It has been described in FIG. 8 that the first external device 320 transmits a GO negotiation request and the electronic device 310 transmits a GO negotiation response. Conversely, the procedure may proceed in a manner that the electronic device 310 transmits a GO negotiation request and the first external device 320 transmits a GO negotiation response.

At operation 820, the electronic device 310 (and/or the first external device 320) compares the GO intent values (e.g., X and Y). The device with a large GO intent value can be determined as the group owner, and the device with a small GO intent value can be determined as a group client. For example, as shown in FIG. 8, if the GO intent value Y of the electronic device 310 is greater than the GO intent value X of the first external device 320, at operation 830, the electronic device 310 may be determined as the group owner and the first external device 320 may be determined as a group client.

At operation 840, the electronic device 310 may determine various parameters for WFD connectivity, such as the operating channel, attributes of the P2P group, and the listening time. At operation 850, the electronic device 310 may send a GO negotiation confirm including the determined information to the first external device 320. This may end group owner negotiation.

With reference back to FIG. 6, upon completion of group owner negotiation at operation 630, at operation 640, the electronic device 310 determined as the group owner operates as the WSC registrar and the first external device 320 determined as a group client operates as a WSC enrollee, and they may perform provisioning by exchanging credentials. Upon completion of credential exchange, the group formation process is ended and data communication may be initiated on the determined operating channel (e.g., first channel).

The electronic device 310 may initiate its role as the group owner on the determined operating channel, and the first external device 320 determined as a group client may connect to the group owner based on the credentials identified through provisioning. The WFD connection between the electronic device 310 and the external device 320 can be finally established through the 4-way handshake process.

Referring to FIG. 9, the 4-way handshake process generates a key value to be used for communication is illustrated.

At operation 912, the first external device 320 may randomly generate a device nonce (SNonce). At operation 914, the electronic device 310 may randomly generate an AP nonce (ANonce). At operation 916, the electronic device 310 may transmit the generated ANonce to the first external device 320. At operation 922, the first external device 320 may generate a pairwise transient key (PTK) based on the received ANonce and the generated SNonce.

At operation 924, the first external device 320 may send the generated SNonce and a message integrity code (MIC) to the electronic device 310. At operation 932, the electronic device 310 may generate a group temporal key (GTK) based on the received values.

At operation 934, the electronic device 310 may transmit the generated GTK and MIC to the first external device 320. At operation 936, the first external device 320 may store the received GTK and return a confirm message. Thereby, the 4-way handshake process may be ended.

At operations 942 and 944, the first external device 320 and the electronic device 310 store information necessary for encryption (e.g., GTK, MIC key) obtained through the 4-way handshake process. Thereafter, the electronic device 310 and the first external device 320 may each use the stored encryption information for communication.

In one embodiment, to increase the connection speed, the electronic device 310 (and/or the first external device 320) may omit the WSC process (or, provision discovery exchange (operation 620 in FIG. 6)), and may exchange key values for the credential or 4-way handshake procedure by use of a separate algorithm. In the embodiment, the WSC process is omitted, but the process from connecting the group client to the group owner through 4-way handshake to finalizing the connection may be the same as in the above-described embodiments.

Referring FIGS. 6, 7, 8, and 9, the electronic device 310 and the first external device 320 perform group owner negotiation to determine the group owner and the group client. However, in some cases (e.g., when the electronic device 310 is a WSB dongle as in FIG. 3C), the electronic device 310 (or the first external device 320) may act as the group owner (autonomous GO) without group owner negotiation. At this time, the electronic device 310 can create a group as the group owner first and wait for other devices such as the first external device 320 to join the group.

Figure 10:
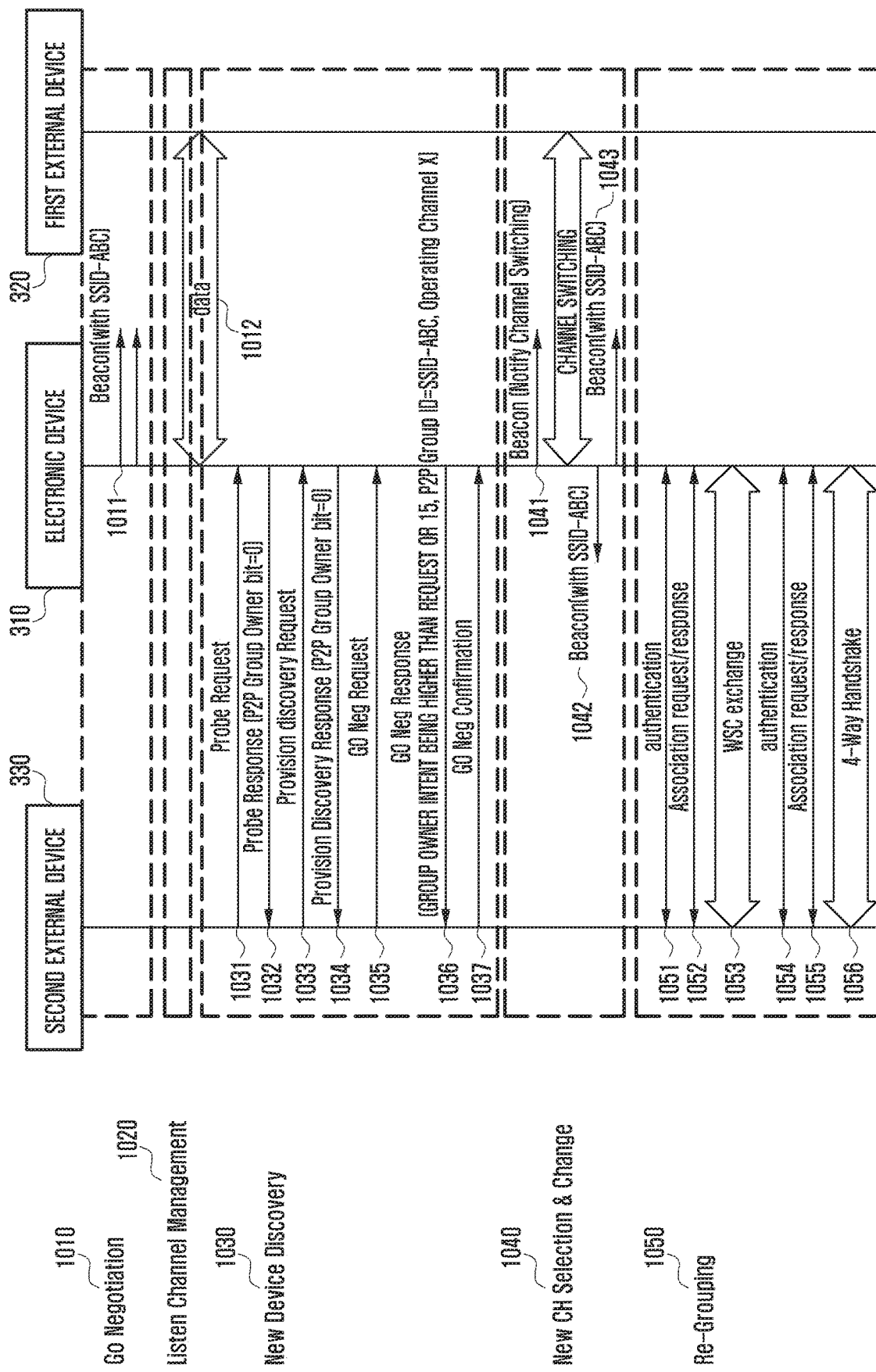
FIG. 10 is a sequence diagram illustrating signal exchange for group formation between an electronic device, the first external device, and a second external device according to various embodiments of the disclosure.

FIG. 10 is a sequence diagram illustrating signal exchange for group formation between an electronic device, a first external device, and a second external device according to various embodiments of the disclosure.

Referring to FIG. 10, can be summarized as GO negotiation 1010, listen channel management 1020, new device discovery 1030, new channel selection and change 1040, and regrouping 1050. The procedure in FIG. 10 may be performed after a WFD group is formed between the electronic device 310 and the first external device 320 through the process described with reference to FIGS. 6 to 9.

Figure 11:
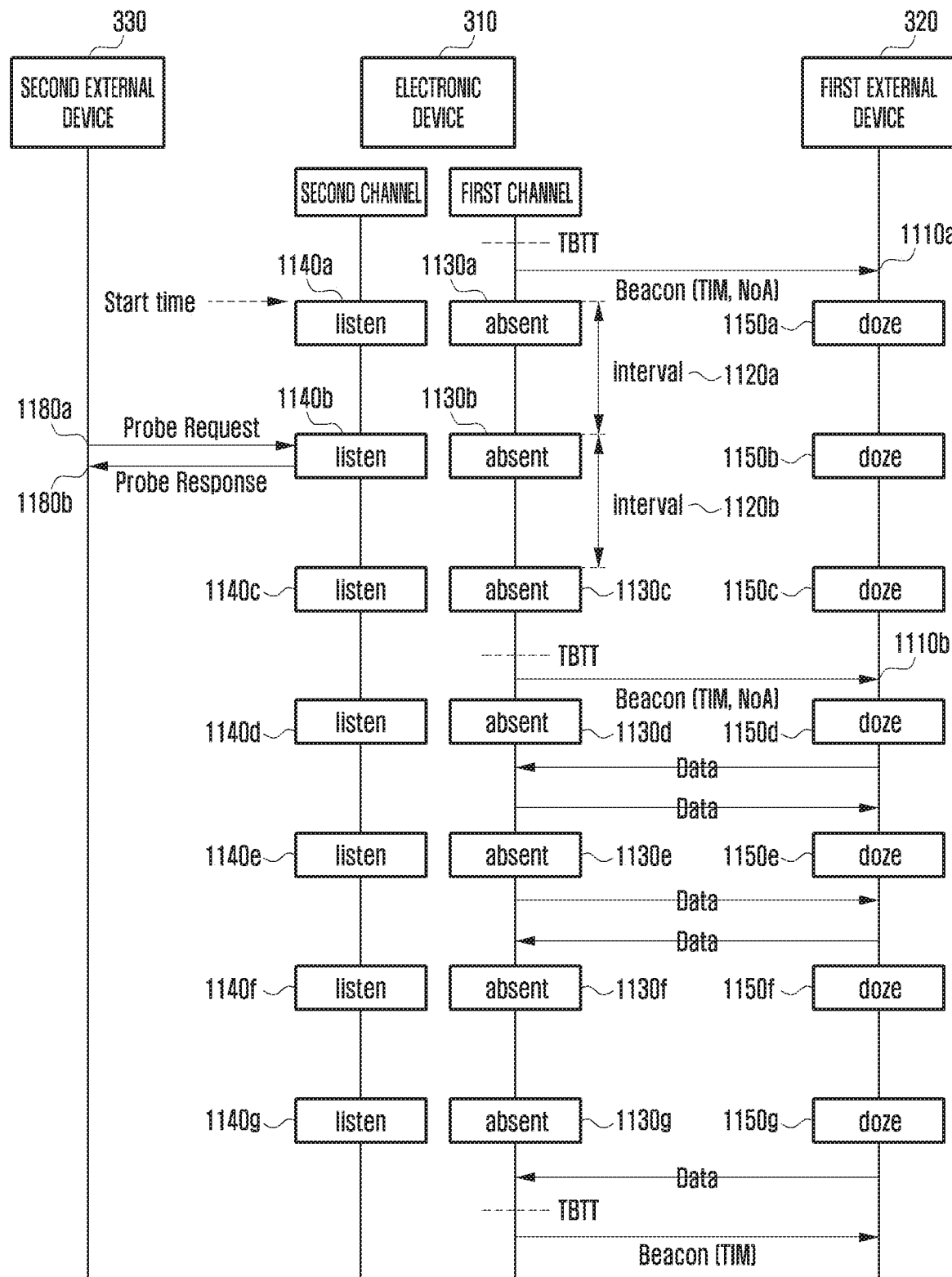
FIG. 11 depicts an electronic device operating an operating channel and a listening channel in a time-division manner according to various embodiments of the disclosure.
Figure 12:
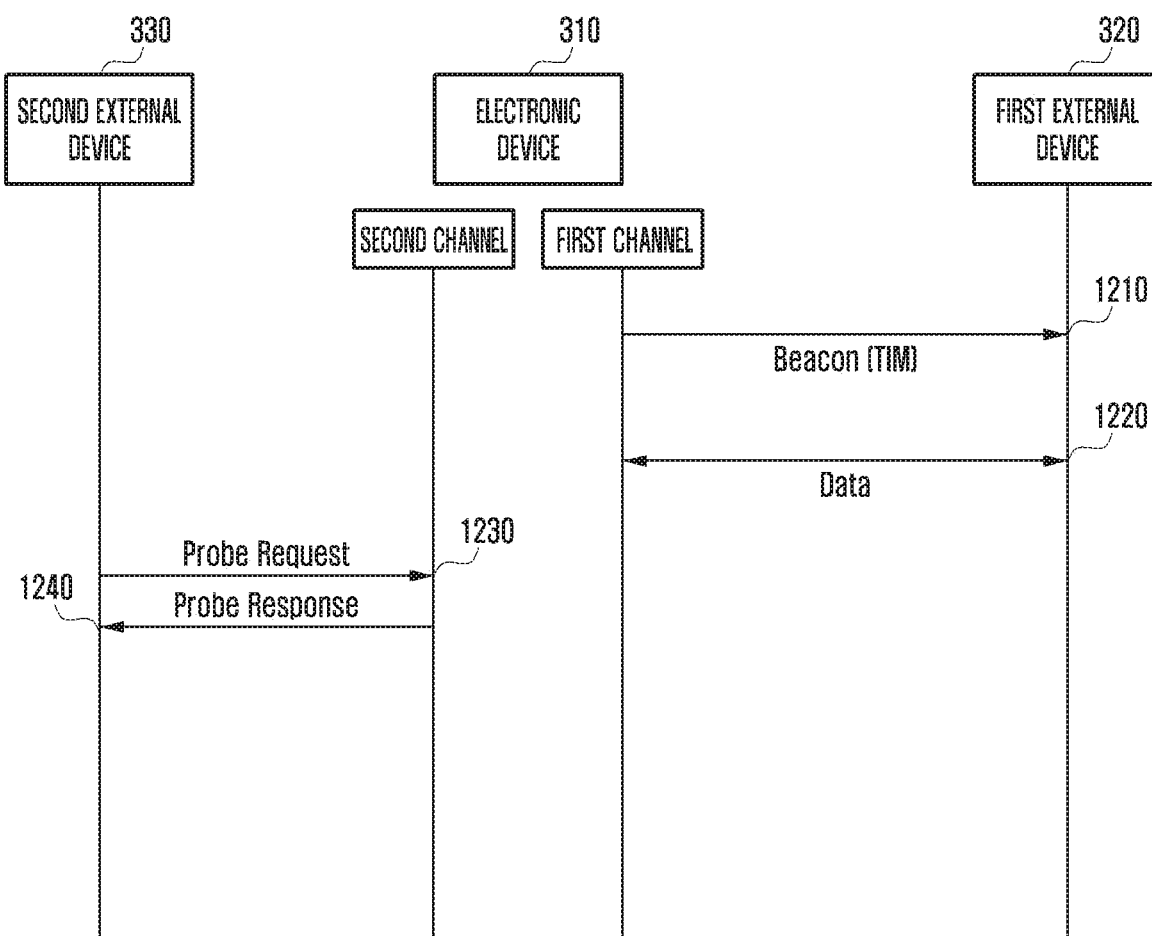
FIG. 12 illustrates a process of an electronic device forming a group of a first external device and a second external device using real simultaneous dual band (RSDB) according to various embodiments of the disclosure.
Figure 13:
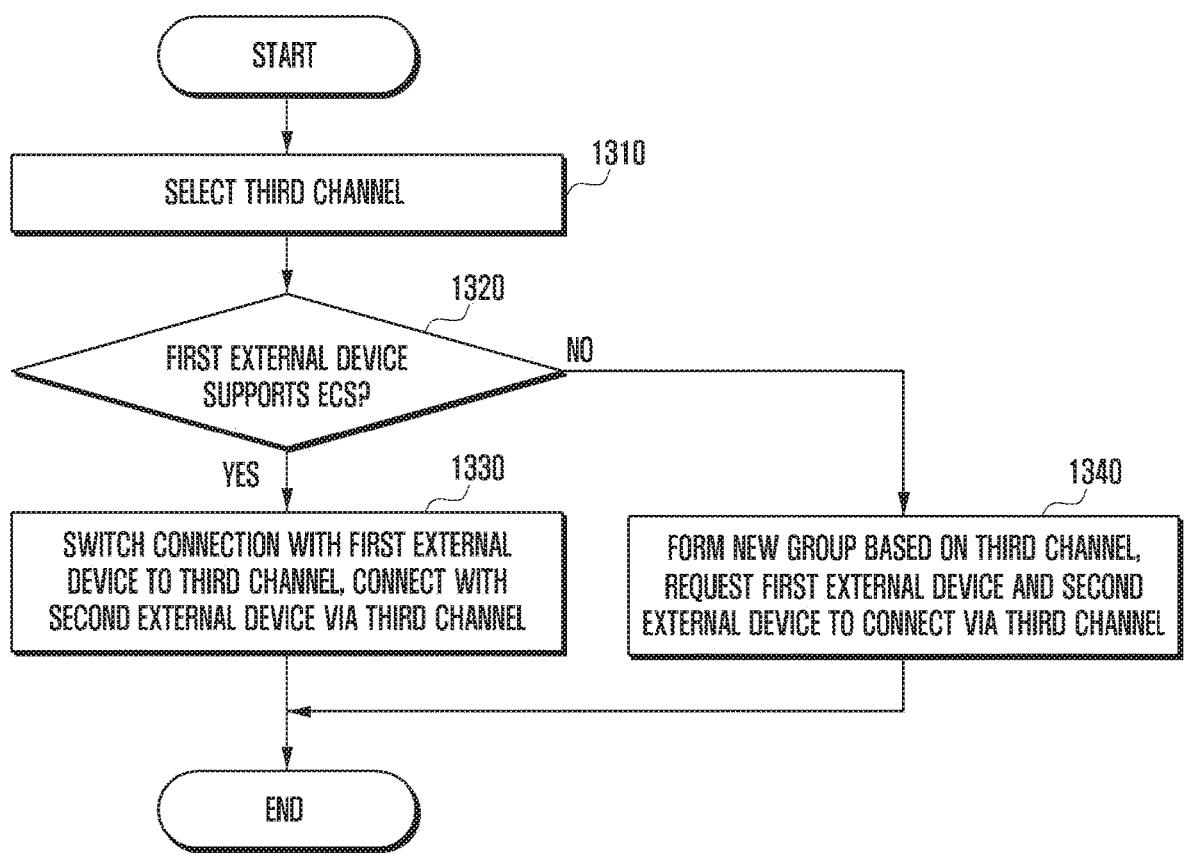
FIG. 13 is a flowchart illustrating a procedure for an electronic device to configure a new channel and change an operating channel according to various embodiments of the disclosure.

Next, a description is given of a process of allowing a second external device 330 to join the group formed between the electronic device 310 and the first external device 320 with reference to FIG. 10. FIGS. 11 to 13 will be further referred to when necessary. The operations shown in FIGS. 10 to 13 may be performed by the processor (e.g., processor 420 in FIG. 4) and/or wireless communication circuit (e.g., wireless communication circuit 410 in FIG. 4) of the electronic device 310.

In GO negotiation 1010, the electronic device 310 may periodically transmit a beacon signal to the first external device 320 and/or another external device during GO negotiation or after forming the group with the first external device 320 at operation 1011. For example, the beacon signal may include a service set identifier (SSID) for identifying the formed group. The electronic device 310 and the first external device 320 may use a first channel in the first frequency band (e.g., 5 GHz frequency band) as the operating channel and transmit data at operation 1012.

In the listen channel management 1020, to permit the second external device 330 to join the group, the electronic device 310 may operate a second channel of the second frequency band (e.g., 2.4 GHz frequency band) different from the first frequency band as a listen channel. It may be necessary for the electronic device 310 to operate the listen channel by using a channel different from the operating channel (e.g., first channel) while acting as the group owner. For example, to permit the second external device 330 using a channel in a different frequency band to join the group, it is necessary to operate the listen channel by using the channel used by the second external device 330. In various embodiments, the electronic device 310 may use social channels (channels 1, 6, 11) of the 2.4 GHz band as a listen channel. In one embodiment, the electronic device 310 may listen to a probe request on the second channel every selected time period while maintaining the wireless connection with the first external device 320 on the first channel. In one embodiment, the electronic device 310 may continue data communication with the first external device 320 on the first channel while operating the listen channel based on the second channel.

In new device discovery 1030, the electronic device 310 may discover a new device. The electronic device 310 may receive a probe request from the second external device 330 via the listen channel (or second channel) at operation 1031. The electronic device 310 may send a probe response in reply to the probe request at operation 1032, in which case the P2P group owner bit (or 0th bit of the group capability) may be set to zero. Thereby, the second external device 330 cannot recognize the existing group formed by the electronic device 310 with the first external device 320.

Upon receiving the probe response, the second external device 330 may transmit a provision discovery request at operation 1033, and the electronic device 310 may transmit a provision discovery response at operation 1034. Then, the second external device 330 sends a GO negotiation request to the electronic device at operation at operation 1035, and the electronic device 310 may send a GO negotiation response at operation 1036 and receive a GO negotiation confirmation at operation 1037. Here, the GO intent value of the electronic device 310 may be set higher than that of the second external device 330, and may be set to the maximum value of 15.

The electronic device 310 may operate the listen channel in various manners according to the characteristics thereof. These various options may be used together in some cases, or only one option may be used independently.

In one embodiment, the electronic device 310 may alternately perform wireless communication with the first external device 320 on the first channel and listening operation on the second channel in such a manner that the operation cycle of the wireless communication circuit is time-divided. This is described with reference to FIG. 11.

The electronic device 310 may perform the operation to maintain the already formed group on the operating channel (e.g., first channel). The electronic device 310 may periodically send a beacon signal as in operation 1010 to notify other devices of the presence of the group, transmit a probe response in return to a probe request received from another device via the operating channel, and manage data transmissions of the group clients. However, the second external device 330, which does not support the first channel, cannot join the group formed on the first channel since it cannot communicate with the electronic device 310 via the first channel.

The electronic device 310 may divide the operation period of the antenna or the wireless communication circuit and perform listening on a specific channel (e.g., second channel) at a specific time while acting as the group owner.

The electronic device 310 may pause the operation on the first channel for some time during the operation period of the first channel, and perform listening on the second channel. To this end, the electronic device 310 may create a notice of absence (NoA) schedule and transmit a beacon signal including the NoA attribute value to the first external device 320. The electronic device 310 may also directly transmit a NoA frame to deliver the NoA schedule and/or timing.

Table 2 below illustrates the format of NoA attributes.

TABLE 2

Notice of Absence attribute format

| Field Name | Size (octets) | Value | Description |
| --- | --- | --- | --- |
| Attribute ID | 1 | 12 | Identifying the type of P2P attribute. The specific value is defined in Table 6. |
| Length | 2 | n * (13) + 2 | Length of the P2P Notice of Absence attribute body in octets. |
| Index | 1 | 0-255 | Identifies an instance of Notice of Absence timing. |
| CTWindow and OppPS Patameters | 1 | — | Parameters indicating P2P Group Owner's availability window and opportunistic power save capability - see Table 27. |
| Notice of Absence Descriptor(s) | n * 13 | — | Zero or more Notice of Absence Descriptors each defining a Notice of Absence timing schedule - see Table 28. |

FIG. 11 depicts an electronic device operating an operating channel and a listening channel in a time-division manner according to various embodiments of the disclosure.

Referring to FIG. 11, the electronic device 310 may periodically transmit a beacon signal including a NoA attribute value to the first external device 320 at operations 1110a and 1110b. In one embodiment, the beacon signal may include a traffic indicator map (TIM). After transmitting the NoA attribute value, the electronic device 310 may transition the first channel to the absent state 1130a to 1130g for some duration of the specified interval 1120a to 1120g. In this case, the first external device 320 may operate in the doze state 1150a to 1150g during the absent period 1130a to 1130f of the first channel according to the received NoA schedule. Hence, data communication between the electronic device 310 and the first external device 320 may be paused during the corresponding duration even if the first external device 320 remains in the active mode. As shown in FIG. 11, data communication between the electronic device 310 and the first external device 320 may be performed only during the non-absent period of the time interval.

The electronic device 310 may perform listening on the second channel during the absent period 1130a to 1130g of the first channel at operations 1140a to 1140g. During the listening period 1140a to 1140g, the electronic device 310 may receive a probe request from the second external device 330 at operation 1180a and transmit a probe response in reply thereto at operation 1180b.

In one embodiment, the electronic device 310 may include a first antenna (not shown) operating in the first frequency band and a second antenna (not shown) operating in the second frequency band, and may perform listening operation on the second channel via the second antenna at least partially simultaneously with wireless communication with the first external device 320 on the first channel via the first antenna. This embodiment is described with reference to FIG. 12.

In various embodiments, the electronic device 310 may operate according to the embodiment of FIG. 11 when it does not support real simultaneous dual band (RSDB), and may operate according to the embodiment of FIG. 12 when it supports RSDB.

When the electronic device 310 supports RSDB, the first antenna and the second antenna may be operated independently. In this case, the electronic device 310 may separately operate the first antenna working on the first channel on which the current group is based and the second antenna working on the second channel for listening.

FIG. 12 illustrates a process of an electronic device forming a group of a first external device and a second external device using RSDB according to various embodiments of the disclosure.

Referring to FIG. 12, the electronic device 310 may perform reception of a probe request at operation 1230 and transmission of a probe response at operation 1240 on the second channel by using the second antenna at least partially simultaneously with performing transmission of a beacon signal at operation 1210 and data communication at operation 1220 on the first channel by using the first antenna.

In one embodiment, the electronic device 310 and the first external device 320 can form a network by bonding the first frequency band and the second frequency band. In this case, even if the electronic device 310 supports RSDB, as independent use of a specific antenna is not possible, the electronic device 310 can operate the listen channel by using either the first antenna or the second antenna according to the time division scheme of FIG. 11.

In one embodiment, the electronic device 310 may include a plurality of independent Wi-Fi support chipsets. For example, the electronic device 310 may include a Wi-Fi chipset operating in the 2.4 GHz frequency band and the 5 GHz frequency band, and a Wi-Fi chipset operating in the 60 GHz frequency band. In this case, the electronic device 310 may mange the operating channel based on the first channel of the first frequency band (e.g., 5 GHz frequency band) or second frequency band (e.g., 2.4 GHz frequency band) through the first chipset, and may manage the listen channel based on the second channel of the third frequency band (e.g., 60 GHz frequency band) through the second chipset.

In another embodiment, even if the electronic device 310 includes a plurality of Wi-Fi support chipsets, the WFD group can be operated by bonding networks supported by two chipsets. In this case, it is possible to operate the listen channel according to the time division scheme described above with reference to FIG. 11 for a network supported by one chipset.

In new device discovery, the electronic device 310 may receive a probe request from the second external device 330 while operating the listen channel. The electronic device 310 may transmit a probe response to the second external device 330 in reply to the probe request.

In various embodiments, when transmitting a probe response to the second external device 330, the electronic device 310 may transmit a probe response not including information about the group formed on the first channel. For example, the electronic device 310 may transmit a probe response not including P2P group information. In addition, to prevent the second external device 330 from recognizing the presence of the group formed with the first external device 320, the zeroth bit of the group capability of the P2P capability attribute constituting the probe response to be sent may be set to zero.

Table 3 illustrates P2P attributes in the probe response frame.

TABLE 3

P2P attributes in the Probe Response frame

| Attributes | Attribute ID | Note |
|---|---|---|
| P2P Capability | 2 | The P2P Capability attribute shall be present in the P2P IE. |
| Extended Listen Timing | 8 | The Extended Listen Timing attribute may be present in the P2P IE. |
| Notice of Absence | 12 | The Notice of Absence shall only be present in the P2P IE in the Probe Response frames transmitted by a P2P Group Owner when a Notice of Absence schedule (see Section 3.3.3.2) or non-zero CTWindow (see Section 3.3.3.2) is being advertised in the Beacon frames (see Section 3.3.3.2). |
| P2P Device Info | 13 | The P2P Device Info attribute shall be present in the P2P IE to indicate the P2P Device Information. |
| P2P Group Info | 14 | The P2P Group Info attribute shall only be present in the P2P IE in the Probe Response frame that is transmitted by a P2P Group Owner. The P2P Group Info attribute shall be omitted if there are zero connected P2P Clients. |
| Advertised Service Info | 25 | The Service Instance attribute may be present in the P2P IE if P2Ps is supported. The usage of this attribute is defined in the Wi-Fi Peer Services specification [11]. |

Table 4 illustrates the format of P2P capability attributes.

TABLE 4

P2P Capability attribute format

| Field | Size (octets) | Value | Description |
|---|---|---|---|
| Attribute ID | 1 | 2 | Identifying the type of P2P attribute. The specific value is defined in Table 6. |
| Length | 2 | 2 | Length of the following fields in the attribute. |
| Device Capability Bitmap | 1 | variable | A set of parameters indicating P2P Device's capabilities, as defined in Table 12. |
| Group Capability Bitmap | 1 | variable | A set of parameters indicating the current state of a P2P Group, as defined in Table 13. |

Table 5 defines the group capability bitmap.

TABLE 5

Group Capability Bitmap definition

| Bit(s) | Information | Note |
|---|---|---|
| 0 | P2P Group Owner | The P2P Group Owner field shall be set to 1 when the P2P Device is operating as a Group Owner, and set to 0 otherwise. |

With reference to Tables 3 to 5, the P2P attributes of a probe response may include a P2P capability, and the P2P capability may include a group capability bitmap. The zeroth bit of the group capability bitmap may correspond to the P2P group owner field.

In various embodiments, the electronic device 310 may compose a probe response by setting the zeroth bit of the capability bitmap shown in Table 5 to zero. In addition, the electronic device 310 may transmit a provision discovery response whose P2P group owner bit is set to zero in reply to the provision discovery request transmitted by the second external device 330. Hence, the second external device 330 may recognize the electronic device 310 as a device without a group.

Accordingly, to form a new group with the electronic device 310, the second external device 330 may send a GO negotiation request to initiate group owner negotiation.

The electronic device 310 may compare the channel list (e.g., second list) of the second external device 330 included in the GO negotiation request received from the second external device 330 with the channel list (e.g., first list) of the first external device 320 having joined the group, and extract a list of channels available to both the first external device 320 and the second external device 330. The electronic device 310 may configure one of the extracted channels as the operating channel (e.g., third channel) for the group to be newly formed.

In one embodiment, the electronic device 310 may select the third channel in consideration of the list of channels available to the electronic device 310 as well as the first list and the second list.

To accept the second external device 330 as a group client of the existing group, the electronic device 310 may set the GO intent value thereof higher than the GO intent value of the second external device 330 identified from the GO negotiation request, or may set the GO intent value thereof to the maximum value of 15. Also, the electronic device 310 may set the group identifier (ID) to the ID of the existing group.

The electronic device 310 may transmit the second external device 330 a GO negotiation response containing information regarding the operating channel, GO intent value, and P2P group ID set as above.

Tables 6 and 7 illustrate P2P attributes in the GO negotiation request frame and the GO negotiation response frame.

TABLE 6

P2P attributes in GO negotiation request frame

| Attributes | Attribute ID | Note |
| --- | --- | --- |
| P2P Capability | 2 | The P2P Capability attribute shall be present in the P2P IE. |
| Group Owner Intent | 4 | The Group Owner Intent attribute shall be present in the P2P IE. |
| Configuration Timeout | 5 | The Configuration Timeout attribute shall be present in the P2P IE. |
| Listen Channel | 6 | The Listen Channel attribute shall be present in the P2P IE. |
| Extended Listen Timing | 8 | The Extended Listen Timing attribute may be present in the P2P IE to advertise Listen State availability of the P2P Device sending the GO Negotiation Request. |
| Intended P2P Interface Address | 9 | The Intended P2P Interface Address attribute shall be present in the P2P IE. |
| Channel List | 11 | The Channel List attribute shall be present in the P2P IE. |
| P2P Device Info | 13 | The P2P Device Information attribute shall be present in the P2P IE. |
| Operating Channel | 17 | The Operating Channel attribute shall be present in the P2P IE. |

TABLE 7

P2P attributes in GO negotiation response frame

| Attributes | Attribute ID | Note |
| --- | --- | --- |
| Status | 0 | The Status attribute shall be present in the P2P IE. |
| P2P Capability | 2 | The P2P Capability attribute shall be present in the P2P IE. |
| Group Owner Intent | 4 | The Group Owner Intent attribute shall be present in the P2P IE. |
| Configuration Timeout | 5 | The Configuration Timeout attribute shall be present in the P2P IE. |
| Operating Channel | 17 | The Operating Channel attribute may be present in the P2P IE. |
| Intended P2P Interface Address | 9 | The Intended P2P Interface Address attribute shall be present in the P2P IE. |
| Channel List | 11 | The Channel List attribute shall be present in the P2P IE. |
| P2P Device Info | 13 | The P2P Device Information attribute shall be present in the P2P IE. |
| P2P Group ID | 15 | The P2P Group ID attribute shall be present tif he P2P Device sending the GO Negotiation Response frame will become P2P Group Owner following Group Owner Negotiation. |

In one embodiment, the electronic device 310 serving as the group owner may selectively accept the group participation request from the second external device 330, and allow the second external device 330 to join the group formed with the first external device 320. To this end, when the electronic device 310 receives a GO negotiation request from the second external device 330, the electronic device 310 may suspend the negotiation by notifying GO negotiation failure, determine whether to permit group participation, and send a GO negotiation request to the second external device 330.

In new channel selection and change 1040, the electronic device 310 may change the operating channel to the selected channel (e.g., third channel). In one embodiment, the electronic device 310 may send a beacon signal indicating channel change to the first external device at operation 1041. Thereafter, when the channel change is completed between the electronic device 310 and the first external device 320, the electronic device 310 may transmit a beacon signal including the SSID (e.g., SSID-ABC) of the changed channel to the first external device and second external device at operations 1042 and 1043.

In regrouping 1050, the electronic device 310 may form a new group with the first external device 320 and the second external device 330 based on the selected channel (e.g., third channel). The regrouping process with the second external device 330 may include authentication at operation 1051, association request and response at operation 1052, WSC exchange at operation 1053, authentication at operation 1054, association request and response at operation 1055, and 4-way handshake at operation 1056.

In one embodiment, if at least one external device including the first external device 320 connected to the electronic device 310 via the first channel allows channel switching to a different channel (e.g. third channel) while maintaining the connection via the first channel, the electronic device 310 may perform channel switching so that the connectivity to the at least one external device (e.g. first external device 320) is changed from the first channel to the selected third channel. In another embodiment, if at least one external device including the first external device 320 connected to the electronic device 310 via the first channel does not allow channel switching to a different channel while maintaining the connection via the first channel, the electronic device 310 may form a new group based on the third channel and send a connection request to the at least one external device including the first external device 320 and the second external device 330 to connect via the third channel.

FIG. 13 is a flowchart illustrating a procedure for an electronic device to configure a new channel and change an operating channel according to various embodiments of the disclosure.

Referring to FIG. 13, at operation 1310, the electronic device 310 may select a third channel. At operation 1320, the electronic device 310 may examine whether the first external device 320 supports ECS. In ECS, to change the channel frequency and bandwidth of the basic service set (BSS) in WFD connectivity, the group owner may notify the changes to the connected group clients and make the changes.

In various embodiments, the electronic device 310 may obtain "supported operating classes" information based on signals exchanged during communication with external devices including the first external device 320, such as an association request, a probe request, and a probe response. The electronic device 310 can determine whether the corresponding external device supports ECS based on the supported operating classes information. With reference to Table 8 below, the supported operating classes information is present if dot11ExtendedChannelSwitchActivated is true. If dot11ExtendedChannelSwitchActivated is true, this may indicate that ECS is supported.

TABLE 8

Association Request frame body

| Order Information | | Notes |
|---|---|---|
| 12 | Supported Operating Classes | The Supported Operating Classes element is present if dot11ExtendedChannelSwitchActivated is true. |

If a received association request (or, probe request, probe response) confirms that dot11ExtendedChannelSwitchActivated is true, the electronic device 310 may transmit a frame including an extended channel switch announcement element of the following format.

| | Element ID | Length | Channel Switch Mode | New Operating Class | New Channel Number | Channel Switch Count |
|---|---|---|---|---|---|---|
| Octets: | 1 | 1 | 1 | 1 | 1 | 1 |

At operation 1330, when the electronic device 310 determines a new operating channel (e.g., third channel) and attempts to switch the BSS to the new operating channel, if all devices belonging to the group (e.g., electronic device 310 and first external device 320) support ECS, the electronic device 310 serving as the group owner can switch the group clients to the new operating channel by executing the ECS operation. The electronic device 310 may connect to the second external device via the third channel.

For ECS, the electronic device 310 serving as the group owner may notify the first external device 320 acting as a group client of a channel switching intent together with information on the new channel and/or classes. The electronic device 310 may include an extended channel switch announcement element in all beacon signals and probe responses transmitted before the intended channel switch time. In the extended channel switch announcement element, the channel switch count indicates the channel switch time, and may indicate the number of target beacon transmission times (TBTT) until the device sending the extended channel switch announcement element performs channel switching. If the channel switch count is 0, channel switching may occur at any time after the frame containing this value is transmitted. The extended channel switch announcement element can be added to the transmitted frame at the position specified in Tables 9 and 10 below.

TABLE 9

Beacon frame body

| Order Information | | Notes |
|---|---|---|
| 35 | Extended Channel Switch Announcement | The Extended Channel Switch Announcement element is optionally present if dot11ExtendedChannelSwitchActivated is true. |

TABLE 10

Probe Response frame body

| Order Information | | Notes |
|---|---|---|
| 33 | Extended Channel Switch Announcement | The Extended Channel Switch Announcement element is optionally present if dot11ExtendedChannelSwitchActivated is true. |

In one embodiment, the electronic device 310 may explicitly deliver the ECS information by transmitting an extended channel switch announcement frame of the format shown below directly to the external device. In this case, the electronic device 310 may transmit the extended channel switch announcement frame in a manner that all connected devices can receive the channel switch information before channel switching is initiated.

| | Category | Public Action | Channel Switch Mode | New Operating Class | New Channel Number | Channel Switch Count | Mesh Channel Switch Parameters element |
|---|---|---|---|---|---|---|---|
| Octets: | 1 | 1 | 1 | 1 | 1 | 1 | 6 |

As described above, when the electronic device 310 changes the operating channel to the selected third channel and begins to transmit a beacon signal via that channel, the associated group clients (e.g., first external device 320) can also switch to the third channel by changing the operating channel.

Upon determining that at least one of the group client devices connected via the first channel does not support ECS at operation 1320, at operation 1340, the electronic device 310 may form a new group based on the third channel and request the group client devices (e.g., first external device 320) connected via the first channel and the second external device 330 to join the new group. In this case, the electronic device 310 may terminate the connection of the existing group operating on the first channel and set the group ID of the new group formed based on the third channel equal to the group ID of the previous group based on the first channel.

In one embodiment, the electronic device 310 may at least partially simultaneously form and maintain multiple groups. For participation of the second external device 330, the electronic device 310 may form a new group based on the third channel, and terminate the group on the first channel only after all the devices having participated in the group on the first channel (including the first external device 320) have joined the new group on the third channel.

The electronic device 310 may initiate operation on the new channel (or third channel) and transmit a beacon signal via this channel. The second external device 330 may receive the beacon signal to thereby identify the WFD group formed by the electronic device 310.

The second external device 330 can search for and attempt to connect to the electronic device 310 serving as the group owner on the third channel based on the previous group owner negotiation information. This process may include at least some of the connection process between the electronic device 310 and the first external device 320 described before with reference to FIGS. 6 to 9.

The electronic device 310 may cause the first external device 320 being a group client on the first channel to join the group based on the third channel in the following way.

In one embodiment, the first external device 320 may attempt to connect in the same manner as the initial WFD connection by performing channel search again. Here, the first external device 320 trying to connect via the third channel has already been connected to the electronic device 310 as a group client, and it can use the group information stored for the previous connection. Since the first external device 320 uses already stored group information, the provisioning process for WSC exchange may be skipped in connection establishment between the electronic device 310 and the first external device 320 based on the third channel.

In another embodiment, the electronic device 310 may request the first external device 320 to join the group by searching for the first external device 320 and sending an invitation request. Here, the invitation request may include a group ID and channel information as group information. In this embodiment, since the first external device 320 has previously been connected, the provisioning process for WSC exchange used in the WFD connection process may be skipped.

Figure 14:
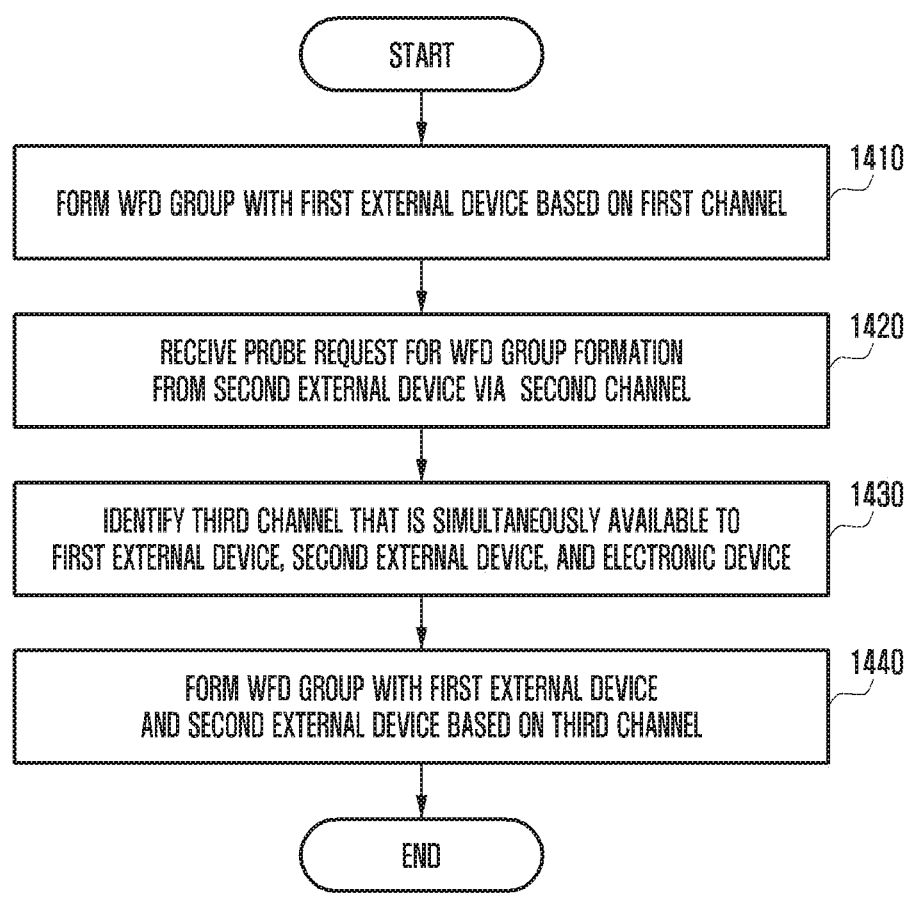
FIG. 14 is a flowchart of a method for an electronic device to form a WFD group according to various embodiments of the disclosure.

FIG. 14 is a flowchart of a method for an electronic device to form a WFD group according to various embodiments of the disclosure.

At operation 1410, the electronic device may form a WFD group with a first external device based on a first channel in a first frequency band (e.g., 5 GHz frequency band). The process for the electronic device to form a WFD group with the first external device has been described with reference to FIGS. 6 to 9.

At operation 1420, the electronic device may receive a probe request for formation of a WFD group from a second external device via a second channel. Here, the second channel may be a social channel (e.g., channel 1, 6 or 11) in a second frequency band (e.g., 2.4 GHz frequency band) different from the first frequency band. As described above with reference to FIGS. 10 to 12, the electronic device can communicate with the first external device via the first channel and perform listening to receive a probe response via the second channel at least partially simultaneously.

At operation 1430, the electronic device may determine a third channel that is simultaneously available to the first external device, the second external device, and the electronic device. For example, the lists of channels available respectively to the first external device and the second external device may be identified from the GO negotiation requests and/or the GO negotiation responses, which are received from the first external device and the second external device during the GO negotiation process.

At operation 1440, the electronic device may form a WFD group with the first external device and the second external device based on the determined third channel. In one embodiment, if the first external device allows channel switching to the third channel while maintaining the connection via the first channel, the electronic device may cause channel switching so that the connectivity to the first external device is changed from the first channel to the third channel. In another embodiment, if the first external device does not allow channel switching to a different channel while maintaining the connection via the first channel, the electronic device may form a new group based on the third channel and request the first external device and the second external device to connect via the third channel.

According to various embodiments of the disclosure, a method of WFD group formation for the electronic device 400 may include receiving a first list of wireless channels for a WFD connection from a first external device 320, establishing, as the GO, a first wireless connection with the first external device 320 acting as a first GC by using a first channel of a first frequency band selected from the first list, listening to a probe request over a second channel of a second frequency band different from the first frequency band every selected time period while maintaining the first wireless connection, receiving a probe request from a second external device 330 during the selected time period through the second channel, transmitting a probe response to the second external device 330 through the second channel, receiving a second list of wireless channels for a WFD connection from the second external device 330 over the second channel, and selecting a third channel that allows simultaneous connectivity with the first external device 320 and the second external device 330 at least partially based on the first list and the second list.

In one embodiment, selecting a third channel may include selecting the third channel further based on a list of channels available to the electronic device 400.

In one embodiment, the first frequency band may include a 5 GHz band, and the second frequency band may include a 2.4 GHz band.

In one embodiment, the electronic device 400 may support the Wi-Fi alliance technical specification.

In one embodiment, the method may further include performing, if at least one external device including the first external device 320 connected to the electronic device 400 via the first channel allows channel switching to a different channel while maintaining the connection via the first channel, channel switching so that the connectivity to the at least one external device is changed from the first channel to the selected third channel.

In one embodiment, the method may further include forming, if at least one external device including the first external device 320 connected to the electronic device 400 via the first channel does not allow channel switching to a different channel while maintaining the connection via the first channel, a new group based on the third channel and sending a connection request to the at least one external device including the first external device 320 and the second external device 330 to connect via the third channel.

In one embodiment, listening to a probe request may include alternately performing wireless communication with the first external device 320 on the first channel and listening operation on the second channel in such a manner that the operation cycle of the wireless communication circuit 410 of the electronic device 400 is time-divided.

In one embodiment, listening to a probe request may include performing wireless communication with the first external device 320 on the first channel via a first antenna and listening on the second channel via a second antenna at least partially simultaneously.

In one embodiment, transmitting a probe response to the second external device 330 may include transmitting a probe response not containing group information at the first channel.

According to various embodiments of the disclosure, a computer-readable storage medium may store instructions that cause an electronic device to receive a first list of wireless channels for a WFD connection from a first external device 320, establish, as the GO, a first wireless connection with the first external device 320 acting as a GC by using a first channel of a first frequency band selected from the first list, listen to a probe request over a second channel of a second frequency band different from the first frequency band every selected time period while maintaining the first wireless connection, receive a probe request from a second external device 330 during the selected time period through the second channel, transmit a probe response to the second external device 330 through the second channel, receive a second list of wireless channels for a WFD connection from the second external device 330 via the second channel, and select a third channel that allows simultaneous connectivity with the first external device 320 and the second external device 330 at least partially based on the first list and the second list.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing;
    a wireless communication circuit positioned inside the housing;
    at least one processor positioned inside the housing and electrically connected to the wireless communication circuit; and
    a memory positioned inside the housing and electrically connected to the at least one processor,
    wherein the memory stores instructions that, when executed, cause the at least one processor and the wireless communication circuit to:
    receive a first list of wireless channels for a direct connection from a first external device,
    establish, as a group owner, a first wireless connection with the first external device acting as a group client by using a first channel of a first frequency band selected from the first list,
    while maintaining the first wireless connection, listen for a probe request over a second channel of a second frequency band different from the first frequency band during every selected time period,
    receive the probe request from a second external device during the selected time period through the second channel,
    transmit a probe response to the second external device through the second channel,
    receive a second list of wireless channels for a direct connection from the second external device over the second channel, and
    select a third channel that allows simultaneous connectivity with the first external device and the second external device based on the first list received from the first external device and the second list received from the first external device.

2. The electronic device of claim 1, wherein the instructions further cause the at least one processor and the wireless communication circuit to select the third channel based on a list of channels available to the electronic device.

3. The electronic device of claim 1, wherein the first frequency band includes a 5 GHz band, and the second frequency band includes a 2.4 GHz band.

4. The electronic device of claim 1, wherein the wireless communication circuit is configured to support a Wi-Fi alliance technical specification.

5. The electronic device of claim 1, wherein the instructions further cause the at least one processor and the wireless communication circuit to:
    determine whether the first external device allows channel switching to a different channel while maintaining the connection via the first channel, and
    when the first external device allows channel switching, switch the connection with the first external device from the first channel to the third channel.

6. The electronic device of claim 1, wherein the instructions further cause the at least one processor and the wireless communication circuit to:
    determine whether the first external device allows channel switching to a different channel while maintaining the connection via the first channel, and
    when the first external device disallows channel switching, form a new group based on the third channel and send a connection request to the first external device and the second external device to connect via the third channel.

7. The electronic device of claim 1, wherein the instructions further cause the at least one processor and the wireless communication circuit to alternately perform wireless communication with the first external device on the first channel and a listening operation on the second channel in such a manner that the operation cycle of the wireless communication circuit is time-divided.

8. The electronic device of claim 1, further comprising:
    a first antenna operating in the first frequency band and a second antenna operating in the second frequency band, wherein the instructions further cause the at least one processor and the wireless communication circuit to listen on the second channel via the second antenna during a wireless communication with the first external device on the first channel via the first antenna.

9. The electronic device of claim 1, wherein the probe response omit group information on the first channel.

10. A method of Wi-Fi direct group formation for an electronic device, the method comprising:
receiving a first list of wireless channels for a direct connection from a first external device;
establishing, as a group owner, a first wireless connection with the first external device acting as a first group client by using a first channel of a first frequency band selected from the first list;
listening for a probe request over a second channel of a second frequency band different from the first frequency band every selected time period while maintaining the first wireless connection;
receiving the probe request from a second external device during the selected time period through the second channel;
transmitting a probe response to the second external device through the second channel;
receiving a second list of wireless channels for a direct connection from the second external device over the second channel; and
selecting a third channel that allows simultaneous connectivity with the first external device and the second external device at least partially based on the first list received from the first external device and the second list received from the second external device.

11. The method of claim 10, wherein selecting of the third channel comprises selecting the third channel further based on a list of channels available to the electronic device.

12. The method of claim 10, wherein the first frequency band includes a 5 GHz band, and the second frequency band includes a 2.4 GHz band.

13. The method of claim 10, wherein the electronic device supports a Wi-Fi alliance technical specification.

14. The method of claim 10, further comprising:
determining whether the first external device allows channel switching to a different channel while maintaining the connection via the first channel; and
when the first external device allows channel switching, switching the connection with the first external device from the first channel to the third channel.

15. The method of claim 10, further comprising:
determining whether the first external device allows channel switching to a different channel while maintaining the connection via the first channel; and
when the first external device disallows channel switching, forming a new group based on the third channel and sending a connection request to the first external device and the second external device to connect via the third channel.

16. The method of claim 10, wherein the listening for the probe request comprises alternately performing wireless communication with the first external device on the first channel and listening operation on the second channel in such a manner that the operation cycle of a wireless communication circuit of the electronic device is time-divided.

17. The method of claim 10, wherein the listening for the probe request comprises performing wireless communication with the first external device on the first channel via a first antenna while listening on the second channel via a second antenna.

18. The method of claim 10, wherein the probe response omits group information at the first channel.

* * * * *